(12) United States Patent
Kishimoto et al.

(10) Patent No.: US 12,197,663 B2
(45) Date of Patent: Jan. 14, 2025

(54) DISPLAY DEVICE

(71) Applicant: Samsung Display Co., LTD., Yongin-si (KR)

(72) Inventors: Hirotsugu Kishimoto, Yongin-si (KR); Yong-Kwan Kim, Yongin-si (KR); Hyunjae Na, Yongin-si (KR); Sungguk An, Yongin-si (KR); Seokwon Jang, Yongin-si (KR); Sung-Ki Jung, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/234,986

(22) Filed: Aug. 17, 2023

(65) Prior Publication Data
US 2024/0152222 A1 May 9, 2024

(30) Foreign Application Priority Data
Nov. 8, 2022 (KR) .................. 10-2022-0147941

(51) Int. Cl.
*G06F 3/041* (2006.01)

(52) U.S. Cl.
CPC .... *G06F 3/041* (2013.01); *G06F 2203/04102* (2013.01)

(58) Field of Classification Search
CPC . G06F 3/041; G06F 2203/04102; G06F 3/044
See application file for complete search history.

(56) References Cited

U.S. PATENT DOCUMENTS

2012/0029343 A1* 2/2012 Wasson .................. H01F 5/003
336/200
2016/0179229 A1* 6/2016 Ahn ...................... H10K 59/40
345/173
(Continued)

FOREIGN PATENT DOCUMENTS

| KR | 20210150942 A | 12/2021 |
| KR | 20220049066 A | 4/2022 |
| KR | 20220087659 A | 6/2022 |

OTHER PUBLICATIONS

Dieter Bohn, How Samsung beefed up its new folding phones: metal, tape, and a dab of goo https://www.theverge.com/22619139/samsung galaxy-z-fold-3-flip-screen-durability-waterproof-aluminum.

*Primary Examiner* — Md Saiful A Siddiqui
(74) *Attorney, Agent, or Firm* — CANTOR COLBURN LLP

(57) ABSTRACT

A display device includes a display module which includes a first non-folding area, a folding area, and a second non-folding area, and a digitizer which includes a first area overlapping the first non-folding area and a portion of the folding area, a second area overlapping the folding area, and a third area overlapping a portion of the folding area and the second non-folding area, where a plurality of holes is defined in the second area through the digitizer, and the digitizer includes a base layer, a plurality of first coils, a plurality of second coils, first signal lines which are connected to the plurality of first coils, overlap the first area, the second area, and the third area, and do not overlap the plurality of holes, and second signal lines connected to the plurality of second coils and overlapping the third area.

19 Claims, 14 Drawing Sheets

(56) References Cited

U.S. PATENT DOCUMENTS

| | | | |
|---|---|---|---|
| 2020/0209998 A1* | 7/2020 | Shin | G06F 3/044 |
| 2020/0333836 A1* | 10/2020 | Kim | G06F 1/1683 |
| 2021/0034180 A1* | 2/2021 | Hirotsugu | G06F 3/046 |
| 2021/0173437 A1* | 6/2021 | Bae | H10K 59/40 |
| 2021/0333944 A1* | 10/2021 | Jung | H10K 59/40 |
| 2022/0113824 A1 | 4/2022 | Kishimoto et al. | |
| 2022/0173126 A1* | 6/2022 | Park | H01L 27/124 |
| 2022/0197440 A1 | 6/2022 | Son et al. | |

* cited by examiner

DISPLAY DEVICE

This application claims priority to Korean Patent Application No. 10-2022-0147941, filed on Nov. 8, 2022, and all the benefits accruing therefrom under 35 U.S.C. § 119, the content of which in its entirety is herein incorporated by reference.

BACKGROUND

1. Field

Embodiments of the disclosure described herein relate to a display device, and more particularly, to a display device in which signal lines of a separated digitizer are arranged differently.

2. Description of the Related Art

Display devices provide information to a user by displaying various images on display screens. In general, the display devices display information within an allocated screen. In recent years, flexible display devices including foldable flexible display panels have been developed. Unlike rigid display devices, the flexible display devices may be folded, rolled, or bent. The flexible display devices, which may be changed in various shapes, may be carried regardless of the existing screen size, and thus user convenience may be improved.

Digitizers of the display devices may include various detection coils to be activated by electrical signals. Regions in which the detection coils are activated by signals applied from an outside.

SUMMARY

Embodiments of the disclosure provide a display device that may secure folding reliability and recognition accuracy by simplifying a structure of a separable digitizer.

According to an embodiment, a display device includes a display module that includes a first non-folding area, a folding area adjacent to the first non-folding area and foldable with respect to a folding axis, and a second non-folding area adjacent to the folding area, and a digitizer disposed below the display module, where the digitizer includes a first area overlapping the first non-folding area and a portion of the folding area, a second area overlapping the folding area, and a third area overlapping a portion of the folding area and the second non-folding area, where a plurality of holes passing is defined in the second area through the digitizer, and the digitizer includes a base layer, a plurality of first coils disposed on the base layer and overlapping the first area, a plurality of second coils disposed on the base layer and overlapping the third area, first signal lines which are connected to the plurality of first coils, overlap the first area, the second area, and the third area, and do not overlap the plurality of holes, and second signal lines connected to the plurality of second coils and overlapping the third area.

In an embodiment, the display device may further include a circuit board disposed in the third area and connected to the first signal lines and the second signal lines.

In an embodiment, the first signal lines may be disposed in a layer different from a layer in which the plurality of first coils and the plurality of second coils are disposed.

In an embodiment, the plurality of first coils may include first type coils extending in a first direction and second type coils extending in a second direction intersecting the first direction, and the plurality of second coils may include third type coils extending in the first direction and fourth type coils extending in the second direction.

In an embodiment, the first signal lines may include first type signal lines connected to the first type coils, and second type signal lines connected to the second type coils.

In an embodiment, the first type signal lines and the second type signal lines may be disposed in different layers, respectively.

In an embodiment, the base layer may include a first surface and a second surface opposite to the first surface, the first type coils and the third type coils may be disposed on the first surface, and the second type coils and the fourth type coils may be disposed on the second surface.

In an embodiment, the digitizer may further include a first adhesive layer which is disposed on the first surface of the base layer and covers the first type coils and the third type coils, and a second adhesive layer which is disposed on the second surface of the base layer and covers the second type coils and the fourth type coils.

In an embodiment, the digitizer may further include a first insulating layer attached to the second adhesive layer, a third adhesive layer disposed on a lower surface of the first insulating layer, and a second insulating layer attached to the third adhesive layer.

In an embodiment, the digitizer may further include a fourth adhesive layer disposed on a lower surface of the second insulating layer, and a third insulating layer attached to the fourth adhesive layer.

In an embodiment, the first type signal lines may be connected to the first type coils via a contact hole defined through at least one selected from the first insulating layer, the second insulating layer, and the base layer.

In an embodiment, the second type signal lines may be connected to the second type coils via a contact hole defined through at least one selected from the first insulating layer and the second insulating layer.

In an embodiment, one first signal line of the first signal lines may be disposed on the first insulating layer and covered by the third adhesive layer, and another first signal line of the first signal lines may be disposed on the second insulating layer and covered by the fourth adhesive layer.

In an embodiment, the display device may further include a lower plate disposed between the display module and the digitizer, where a plurality of plate openings overlapping the folding area may be defined through the lower plate.

In an embodiment, a number of the first signal lines may be 50 or less.

In an embodiment, a width of the second area may be less than a width of the folding area.

In an embodiment, a width of the second area may be greater than or equal to about 1 millimeters (mm) and less than or equal to about 5 mm.

According to an embodiment, a display device includes a display module that includes a first non-folding area, a folding area adjacent to the first non-folding area and foldable with respect to a folding axis, and a second non-folding area adjacent to the folding area, a lower plate disposed below the display module, where a plurality of plate openings overlapping the folding area is defined through the lower plate, and a digitizer disposed below the display module, where the digitizer includes a first area overlapping the first non-folding area and a portion of the folding area, a second area overlapping the folding area, and a third area overlapping a portion of the folding area and the second non-folding area and is disposed below the display module, where a plurality of holes is defined in the second area through the digitizer, the digitizer includes a base layer, a plurality of coils disposed on the base layer, signal lines connected to the plurality of coils in the first area, overlapping the first area, the second area, and the third area, and passing between corresponding holes among the plurality of holes, and a circuit board disposed in the third area and connected to the signal lines.

In an embodiment, the number of the signal lines may be 50 or less.

In an embodiment, one signal line and another signal line among the signal lines may be disposed in different layers, respectively.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1A:
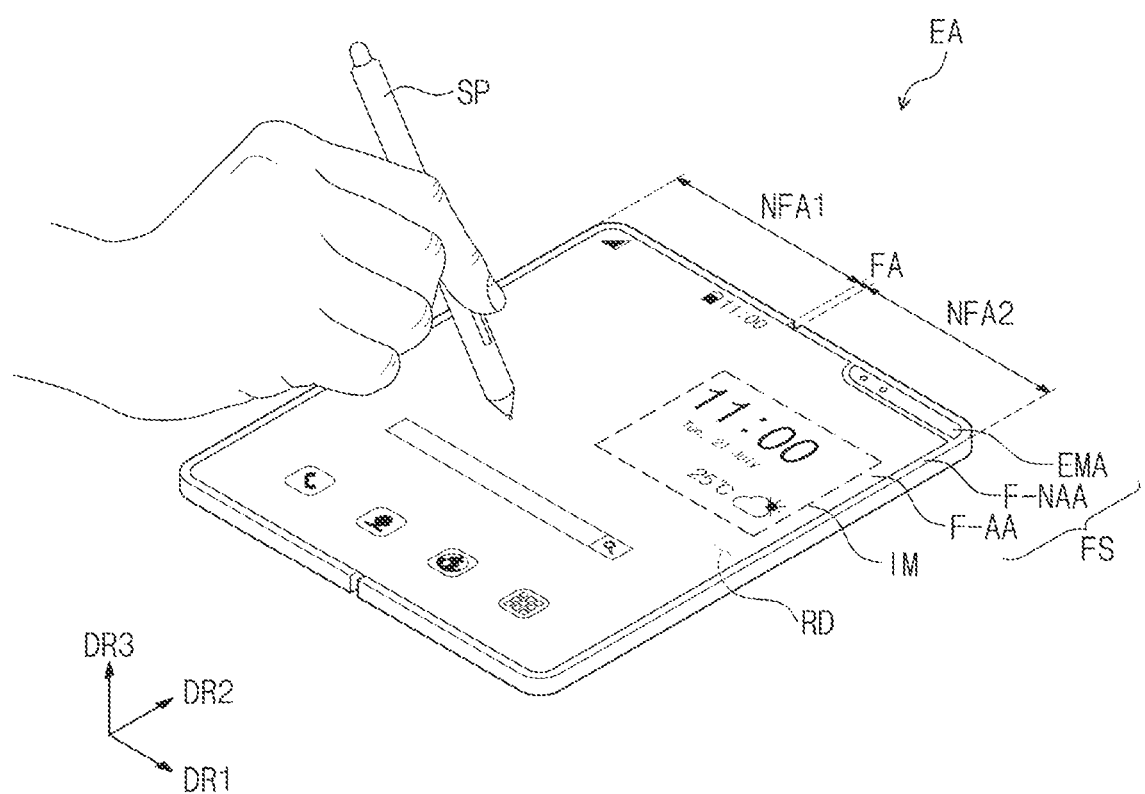
FIG. 1A is a perspective view of a display device in an unfolded state according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numerals refer to the same components. Further, in the drawings, the thickness, the ratio, and the dimension of components are exaggerated for effective description of technical contents.

Although the terms "first", "second", etc. may be used to describe various components, the components should not be limited by the terms. The terms are only used to distinguish one component from another component. For example, without departing from the right scope of the disclosure, a first component may be referred to as a second component, and similarly, the second component may be also referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical terms and scientific terms) used in the specification have the same meaning as commonly understood by those skilled in the art to which the disclosure belongs. Furthermore, terms such as terms defined in the dictionaries commonly used should be interpreted as having a meaning consistent with the meaning in the context of the related technology and should not be interpreted in overly ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

FIG. 1A is a perspective view of a display device EA in an unfolded state according to an embodiment of the disclosure.

Referring to FIG. 1A, an embodiment of the display device EA may be a device that is activated in response to an electric signal. The display device EA may include a various types of electronic device. In an embodiment, for example, the display device EA may include a tablet, a laptop, a computer, a television, and the like. In an embodiment, the display device EA may be a smart phone as shown in FIG. 1A.

The display device EA may display an image IM in a third direction DR3 on a first display surface FS parallel to a first direction DR1 and a second direction DR2. The first display surface FS on which the image IM is displayed may correspond to a front surface of the display device EA. The image IM may include a still image as well as a dynamic image. In an embodiment, as shown in FIG. 1A, the image IM may include an Internet search bar, a clock window, and a plurality of applications.

In the disclosure, an upper surface (or a front surface) and a lower surface (or a rear surface) of each component are defined with respect to a direction in which the image IM is displayed. The front surface and the rear surface may be opposite to each other in the third direction DR3, and a normal direction of each of the front and rear surfaces may be parallel to the third direction DR3.

A separation distance between the front surface and the rear surface in the third direction DR3 may correspond to a thickness/height of the display device EA in the third direction DR3. The third direction DR3 may be a thickness direction of the display device EA. Here, directions indicated by the first to third directions DR1, DR2, and DR3 are relative concepts and may be changed to other directions.

The display device EA may detect an external input applied to the display device EA. The external input may include various types of input provided from the outside of the display device EA. In an embodiment, for example, the external input may include a contact by a part of a body of a user such as a hand and an external input (for example, hovering) applied close to the display device EA or adjacent to the display device EA at a predetermined distance. The external input may have various forms such as a force, pressure, a temperature, and light.

FIG. 1A illustratively illustrates the external input through a pen SP of a user. Although not illustrated, the pen SP may be mounted or detached inside or outside the display device EA, and the display device EA may provide or receive a signal corresponding to the mounting or detaching of the pen SP.

The display device EA may include the first display surface FS and s second display surface RD. The first display surface FS may include a first active area F-AA, a first peripheral area F-NAA, and an electronic module area EMA. The second display surface RD may be defined as a surface opposite to at least a portion of the first display surface FS.

The first active area F-AA may be an area that is activated in response to an electrical signal. The first active area F-AA may be an area on which the image IM may be displayed and by which input of the pen SP may be detected.

The first peripheral area F-NAA may be adjacent to the first active area F-AA. The first peripheral area F-NAA may have a predetermined color. The first peripheral area F-NAA may surround the first active area F-AA. Accordingly, the shape of the first active area F-AA may be defined substantially by the first peripheral area F-NAA. However, this is illustrative, and alternatively, the first peripheral area F-NAA may be disposed adjacent to only one side of the first active area F-AA or may be omitted.

Various electronic modules may be arranged in the electronic module area EMA. In an embodiment, for example, the electronic module may include at least one selected from a camera, a speaker, a light detection sensor, and a heat detection sensor. The electronic module area EMA may detect an external subject received through the display surfaces FS and RD or provide a sound signal such as voice to the outside through the display surfaces FS and RD. The electronic module may include a plurality of components, and the disclosure is not limited to an embodiment.

The electronic module area EMA may be surrounded by the first peripheral area F-NAA. However, this is illustrative, and the disclosure is not limited thereto. In an alternative embodiment, for example, the electronic module area EMA may be surrounded by the first active area F-AA and the first peripheral area F-NAA, and the electronic module area EMA may be disposed inside the first active area F-AA.

The display device EA according to an embodiment may include at least one folding area FA and a plurality of non-folding areas NFA1 and NFA2 extending from the folding area FA. In an embodiment, for example, the first non-folding area NFA1, the folding area FA, and the second non-folding area NFA2 may be defined in the first direction DR1. That is, the first non-folding area NFA1 may be extend from the folding area FA in a direction opposite to the first direction DR1, and the second non-folding area NFA2 may extend from the folding area FA in the first direction DR1.

The folding area FA may refer to a foldable area, and the first and second non-folding areas NFA1 and NFA2 may refer to non-foldable areas. The folding area FA may be adjacent to the first non-folding area NFA1 and the second non-folding area NFA2 and may be folded with respect to a folding axis AX1 or AX2 (see FIG. 1B or 1D).

Figure 1B:
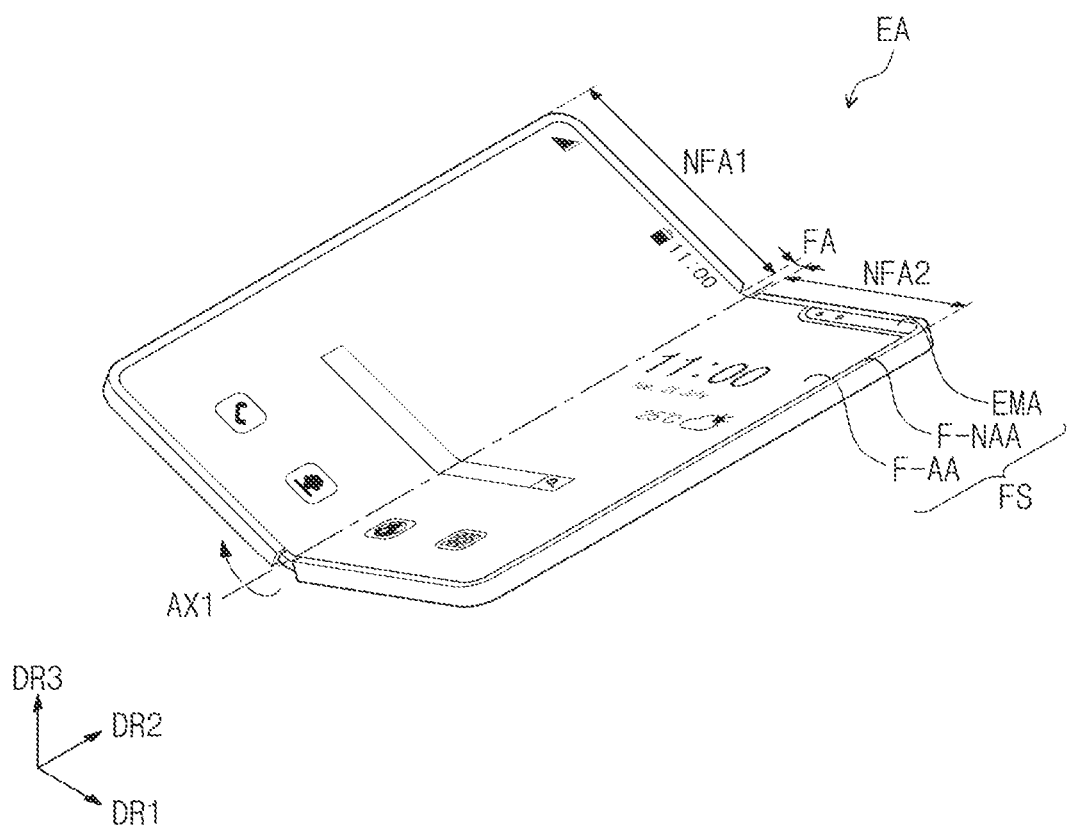
FIG. 1B is a perspective view illustrating the display device in a folding operation according to an embodiment of the disclosure.

FIG. 1B is a perspective view illustrating the display device EA in a folding operation according to an embodiment of the disclosure.

Referring to FIG. 1B, the display device EA according to an embodiment may be folded with respect to the first folding axis AX1 extending in the second direction DR2. When the display device EA is in a folded state, the folding area FA may have a predetermined curvature and a predetermined radius of curvature. The display device EA may be folded with respect to the first folding axis AX1 so that the first non-folding area NFA1 and the second non-folding area NFA2 face each other and may be deformed into an in-folding state so that the first display surface FS is not exposed to the outside.

Figure 1C:
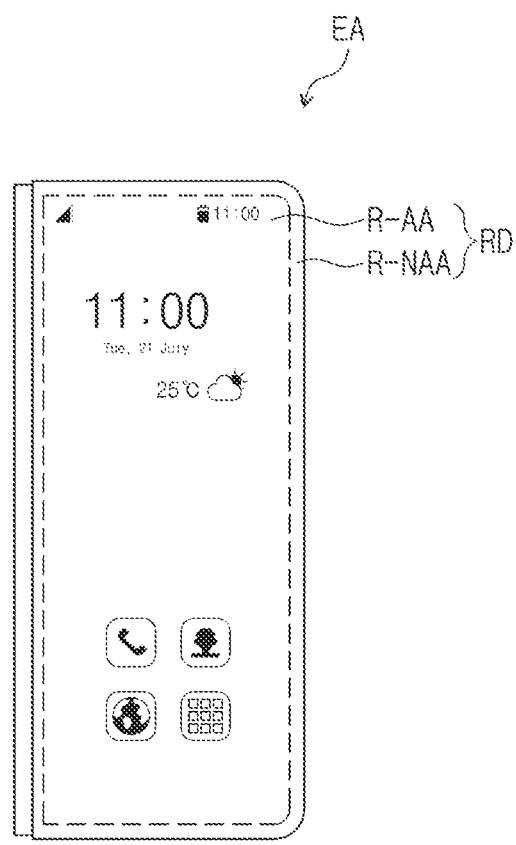
FIG. 1C is a plan view of the display device in a folded state according to an embodiment of the disclosure.

FIG. 1C is a plan view of the display device EA in a folded state according to an embodiment of the disclosure.

Referring to FIG. 1C, in a state in which the display device EA according to an embodiment is in-folded, the second display surface RD may be visually recognized by the user. In such an embodiment, the second display surface RD may include a second active area R-AA that displays an image. The second active area R-AA may be an area that is activated in response to an electrical signal. The second active area R-AA may be an area on which an image is displayed and which may detect various types of external input.

A second peripheral area R-NAA may be adjacent to the second active area R-AA. The second peripheral area R-NAA may have a predetermined color. The second peripheral area R-NAA may surround the second active area R-AA. in an embodiment, although not illustrated, the second display surface RD may further include an electronic module area in which electronic modules including various components are arranged, and the disclosure is not limited to an embodiment.

Figure 1D:
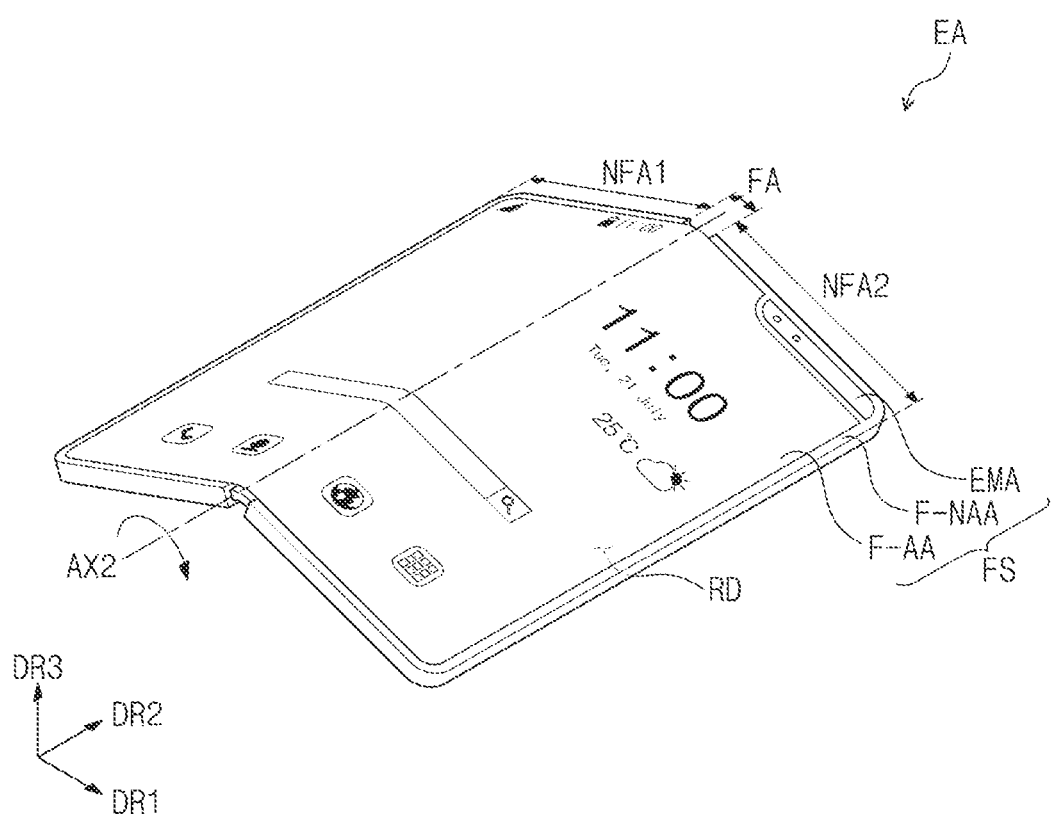
FIG. 1D is a perspective view illustrating the display device in a folding operation according to an embodiment of the disclosure.

FIG. 1D is a perspective view illustrating the display device EA in a folding operation according to an embodiment of the disclosure.

Referring to FIG. 1D, the display device EA according to an embodiment may be folded with respect to the second folding axis AX2 extending in the second direction DR2. The display device EA may be folded with respect to the second folding axis AX2 and deformed into an out-folding state so that the first display surface FS is exposed to the outside. In an embodiment of the disclosure, the display device EA may be configured to repeatedly perform an in-folding operation and an out-folding operation from an unfolding operation, but the disclosure is not limited thereto.

Although FIGS. 1A to 1D illustratively illustrate embodiments where the folding is operated with respect to the one folding axis AX1 or AX2, the number of folding axes and the number of non-folding areas are not limited thereto. In an alternative embodiment, for example, the display device EA may be folded with respect to a plurality of folding axes so that the first display surface FS and the second display surface RD are folded to partially face each other.

Figure 2:
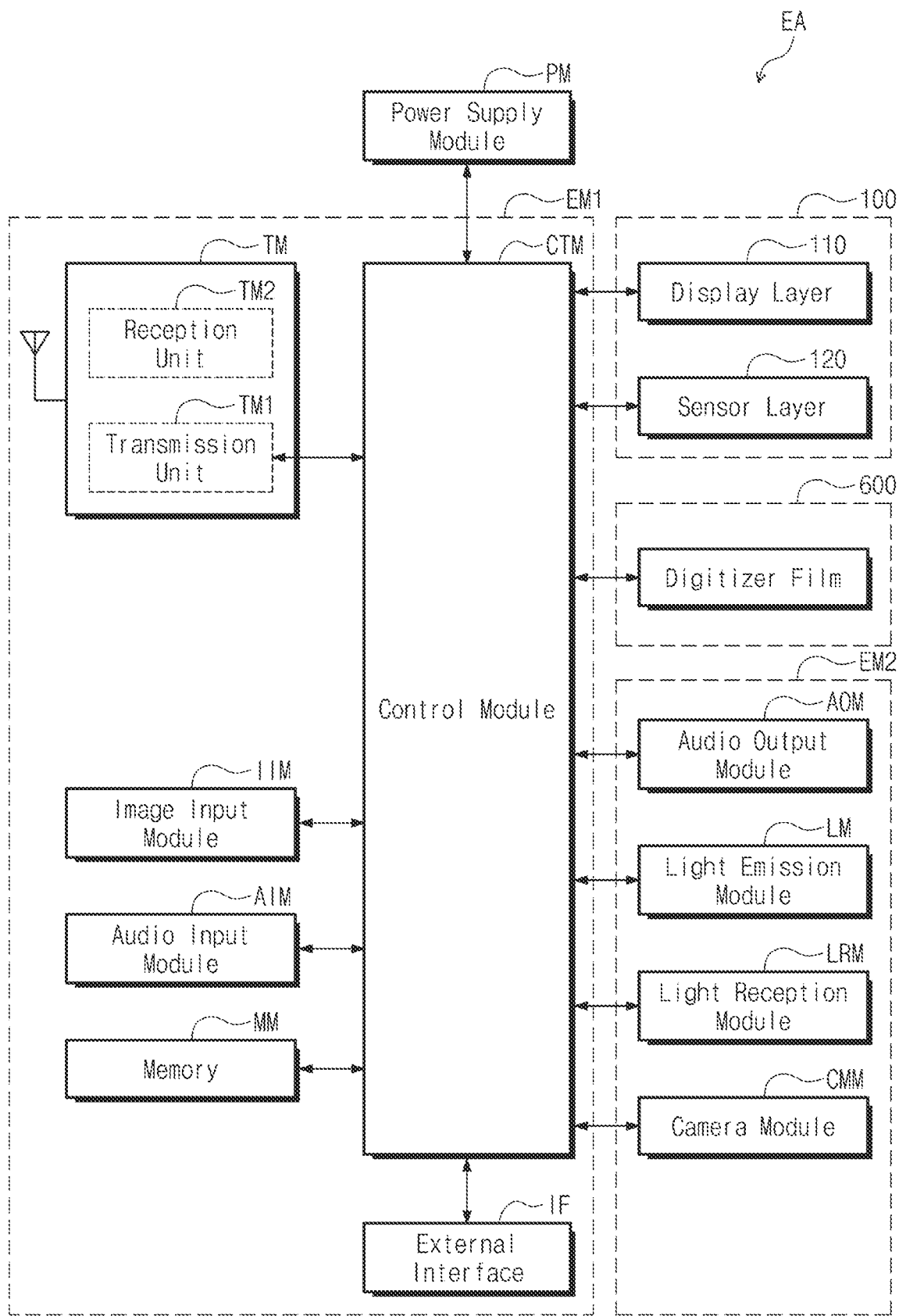
FIG. 2 is a block diagram of the display device according to an embodiment of the disclosure.

FIG. 2 is a block diagram of the display device EA according to an embodiment of the disclosure.

Referring to FIG. 2, an embodiment of the display device EA according to the disclosure may include a display module 100, a power supply module PM, a first electronic module EM1, and a second electronic module EM2. The display module 100, a digitizer 600, the power supply module PM, the first electronic module EM1, and the second electronic module EM2 may be electrically connected to each other.

The display module 100 may include a display layer 110 and a sensor layer 120. The display layer 110 may be a component which substantially generates an image. The image generated by the display layer 110 may be visually recognized by the user from the outside through the first display surface FS (see FIG. 1A).

The first electronic module EM1 and the second electronic module EM2 may include various functional modules for operating the display device EA. The first electronic module EM1 may be mounted on a motherboard electrically connected to the display module 100 or mounted on a separate substrate and thus may be electrically connected to the motherboard through a connector (not illustrated).

The first electronic module EM1 may include a control module CTM, a wireless communication module TM, an image input module IIM, an audio input module AIM, a memory MM, and an external interface IF. Some of the modules of the first electronic module EM1 may not be mounted on the motherboard and may be electrically connected to the motherboard through a flexible circuit board.

The control module CTM controls an overall operation of the display device EA. The control module CTM may be a micro-processor. In an embodiment, for example, the control module CTM may activate or deactivate the display module 100. The control module CTM may control other modules such as the image input module IIM and the audio input module AIM on the basis of a touch signal received from the display module 100.

The wireless communication module TM may transmit/receive a wireless signal to/from another terminal using a Bluetooth or a Wi-Fi line. The wireless communication module TM may transmit/receive an audio signal using a general communication line. The wireless communication module TM may include a transmission unit TM1 for modulating and transmitting a signal to be transmitted and a reception unit TM2 for demodulating a received signal.

The image input module IIM may process an image signal and convert the processed image signal into image data that may be displayed on the display module 100. The audio input module AIM may receive an external audio signal through a microphone in a recording mode, a voice recognition mode, or the like and convert the received external audio signal into electrical voice data.

The external interface IF may serve as an interface connected to an external charger, a wired/wireless data port, a card socket (for example, a memory card and a subscriber identification module (SIM)/user identification module (UIM) card), and the like.

The second electronic module EM2 may include an audio output module AOM, a light emission module LM, a light reception module LRM, a camera module CMM, or the like. The components may be directly mounted on the motherboard or mounted on a separate substrate and electrically connected to the display module 100 or electrically connected to the first electronic module EM1 through the connector (not illustrated).

The audio output module AOM may convert audio data received from the wireless communication module TM or audio data stored in the memory MM into a voice and output the converted voice to the outside.

The light emission module LM may generate and output light. In an embodiment, for example, the light emission module may output infrared rays. The light emission module LM may include a light emitting diode (LED) element. The light reception module LRM may detect infrared rays. The light reception module LRM may be activated when infrared rays having a predetermined level or higher are detected. The light reception module LRM may be a complementary metal-oxide semiconductor (CMOS) sensor. The infrared rays generated by the light emission module LM are output and then reflected by the external subject (for example, a finger or face of the user), and the reflected infrared rays may be input to the light reception module LRM. The camera module CMM may capture an external image.

The digitizer 600 may be in a form of a film, e.g., a digitizer film. The digitizer 600 may include a plurality of coils RFa, CFa, RFb, and CFb (see FIG. 4A), a base layer BS (see FIG. 5), and insulating layers CV, PI1, PI2, and PI3 (see FIG. 6).

The digitizer 600 may detect the external input in an electromagnetic resonance (EMR) manner. In the EMR manner, a magnetic field is generated in a resonant circuit configured inside the pen SP (see FIG. 1A), the oscillating magnetic field induces a signal to a plurality of coils included in the digitizer 600, and thus a position of the pen SP may be detected through signals induced in the coils. A detailed description of the digitizer 600 will be made below.

Figure 3:
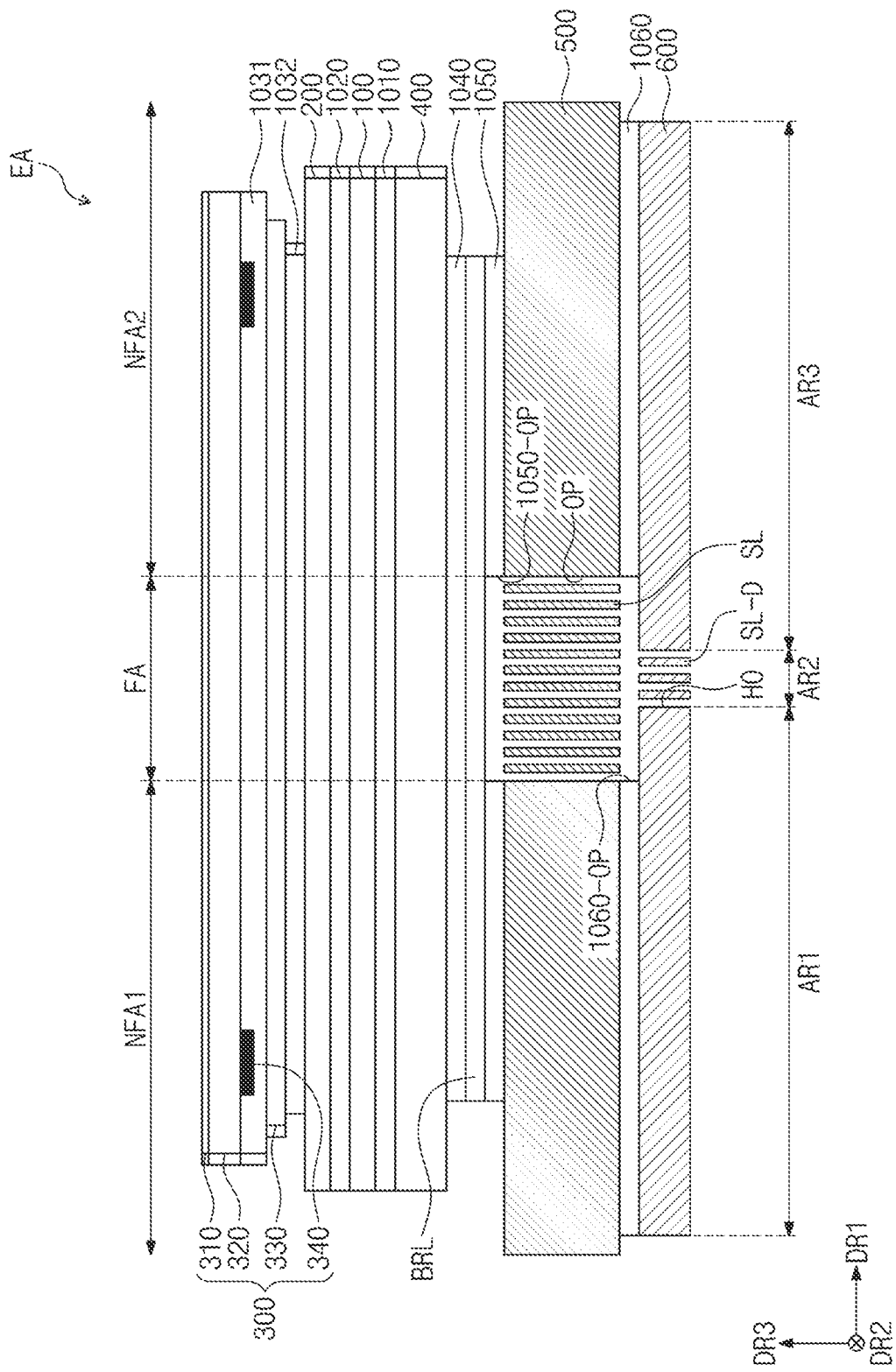
FIG. 3 is a cross-sectional view of the display device according to an embodiment of the disclosure.

FIG. 3 is a cross-sectional view of the display device EA according to an embodiment of the disclosure.

Referring to FIG. 3, an embodiment of the display device EA may include a window module 300, an optical film 200, the display module 100, a panel protection layer 400, a barrier layer BRL, a lower plate 500, and the digitizer 600. In such an embodiment, the display device EA may further include adhesive layers 1031, 1032, 1020, 1010, 1040, 1050, and 1060 that bond the respective components to each other.

The adhesive layers 1031, 1032, 1020, 1010, 1040, 1050, and 1060, which will be described below, may be a transparent adhesive layer including at least one selected from a pressure sensitive adhesive (PSA) film, an optically clear adhesive (OCA) film, and an optically clear resin (OCR). In an embodiment, at least one selected from the adhesive layers 1031, 1032, 1020, 1010, 1040, 1050, and 1060 may be omitted.

The window module 300 may be disposed on the display module 100. The window module 300 may be coupled to a housing (not illustrated) to define an exterior and protect the display module 100. The window module 300 may include a glass substrate 330, a window protection layer 320, and a light shielding pattern 340.

The glass substrate 330 may include a material having high light transmittance. In an embodiment, the glass substrate 330 may include or be made of chemically strengthened glass. In such an embodiment, even when the glass substrate 330 is repeatedly folded and unfolded, occurrence of wrinkles may be minimized.

The window protection layer 320 may be disposed on the glass substrate 330. The window protection layer 320 and the glass substrate 330 may be coupled to each other by the adhesive layer 1031. The window protection layer 320 may include a plastic film. In an embodiment, for example, the window protection layer 320 may include at least one selected from polyimide, polycarbonate, polyamide, triacetylcellulose, polymethylmethacrylate, and polyethylene terephthalate.

The light shielding pattern 340 may be disposed on a lower surface of the window protection layer 320. The light shielding pattern 340 may be disposed on one surface of the window protection layer 320, which faces the glass substrate 330. The adhesive layer 1031 may cover the light shielding pattern 340, but the disclosure is not limited thereto.

The light shielding pattern 340 may be a colored light shielding film, and may be formed by, for example, a coating method. The light shielding pattern 340 may include a base material and a dye or pigment mixed with the base material. Thus, the user may recognize the first peripheral area F-NAA of the display device EA on the basis of a predetermined color of the light shielding pattern 340. That is, the light shielding pattern 340 may overlap the first peripheral area F-NAA illustrated in FIG. 1A.

FIG. 3 illustrates an embodiment where the light shielding pattern 340 is disposed on the window protection layer 320 at a predetermined distance from an end (e.g., a side edge) of the window protection layer 320, but the disclosure is not limited thereto. In an alternative embodiment, the light shielding pattern 340 may be disposed below the window protection layer 320 to be aligned with the end of the window protection layer 320, and the disclosure is not limited thereto.

FIG. 3 illustratively illustrates an embodiment where the light shielding pattern 340 is disposed on the lower surface of the window protection layer 320, but the disclosure is not limited thereto. In an embodiment, for example, the light shielding pattern 340 may be disposed on any one of an upper surface of the window protection layer 320 or an upper surface or a lower surface of the glass substrate 330.

In an embodiment, the window module 300 may further include a hard coating layer 310. The hard coating layer 310 may be disposed on the window protection layer 320 and disposed on an outermost layer of the window module 300. The hard coating layer 310 serves as a functional layer for improving use characteristics of the display device EA and may be provided by being coated on the window protection layer 320. In an embodiment, for example, anti-fingerprint properties, anti-fouling properties, anti-reflection properties, or anti-scratch properties may be improved by the hard coating layer 310.

The optical film 200 may be disposed below the window module 300. The optical film 200 and the window module 300 may be coupled to each other by the adhesive layer 1032. The optical film 200 may reduce external light reflectance of the display module 100 with respect to light input in the display module 100. Although not illustrated, the optical film 200 may further include at least one selected from an anti-reflection film, a polarizing film, a color filter, and a gray filter.

The display module 100 may be disposed below the optical film 200. The display module 100 and the optical film 200 may be coupled to each other by the adhesive layer 1020. The display module 100 may function as an output device for displaying an image and function as an input device for detecting input applied from the outside. In an embodiment, for example, the display module 100 may include the display layer 110 and the sensor layer 120 described in FIG. 2. The display layer 110 may be a component which substantially generates an image. The display layer 110 may be an organic light emitting display panel, a quantum-dot display panel or an inorganic light emitting display panel, and the disclosure is not particularly limited thereto.

The panel protection layer 400 may be disposed below the display module 100. The panel protection layer 400 and the display module 100 may be coupled to each other by the adhesive layer 1010. The panel protection layer 400 may protect the display module 100. In an embodiment, for example, the panel protection layer 400 may reduce a stress applied to the display module 100 when the display device EA is folded. Further, the panel protection layer 400 may effectively prevent external moisture from penetrating into the display module 100 and may absorb an external impact.

The panel protection layer 400 may include a flexible plastic material. In an embodiment, for example, the panel protection layer 400 may include polyethylene terephthalate.

In an embodiment, as shown in FIG. 3, the panel protection layer 400 overlaps the folding area FA and the first and second non-folding areas NFA1 and NFA2, but the disclosure is not limited thereto. In an alternative embodiment, the panel protection layer 400 may include two protective layers not overlapping the folding area FA and overlapping the first and second non-folding areas NFA1 and NFA2.

The barrier layer BRL may be disposed below the panel protection layer 400. The barrier layer BRL and the panel protection layer 400 may be coupled to each other by the adhesive layer 1040. The barrier layer BRL may increase resistance against a compressive force caused by external pressure. Thus, the barrier layer BRL may serve to prevent deformation of the display module 100.

The barrier layer BRL may include a flexible plastic material such as polyimide or polyethylene terephthalate. Further, the barrier layer BRL may be a colored film having low light transmittance. The barrier layer BRL may absorb light input from the outside. In an embodiment, for example, the barrier layer BRL may be a black synthetic resin film. When the display device EA is viewed from the front side of the window protection layer 320, components arranged below the barrier layer BRL may not be visually recognized by the user. However, the disclosure is not limited thereto, and in the display device EA according to an alternative embodiment, the barrier layer BRL may be omitted.

The lower plate 500 may be disposed between the display module 100 and the digitizer 600. The lower plate 500 may support components arranged above the lower plate 500 and maintain the display module 100 in an unfolded state and a folded state. Further, heat dissipation performance of the display device EA may be improved by the lower plate 500.

A plurality of plate openings OP may be defined in an area of the lower plate 500 overlapping the folding area FA. The plurality of plate openings OP may be formed through the lower plate 500 from an upper surface to a lower surface thereof. A portion between the plurality of plate openings OP in the folding area FA may have a slit (SL) structure. The slit (SL) structure may have a shape in which slits SL are connected to each other like a mesh.

According to an embodiment of the disclosure, when the display device EA is in-folded with respect to the first folding axis AX1 (see FIG. 1B-B), an area of the plurality of plate openings OP between the slits SL may increase or decrease according to the folding direction, and when the display device EA is non-folded, the plurality of plate openings OP may return to their original shapes. Thus, as the plurality of plate openings OP are formed in an area overlapping the folding area FA, the shape of the lower plate 500 may be more easily deformed when the display device EA is folded.

The lower plate 500 may include at least one selected from stainless steel, titanium, and a reinforced fiber composite. The reinforced fiber composite may be carbon fiber reinforced plastic (CFRP) or glass fiber reinforced plastic (GFRP). However, a material of the lower plate 500 is not limited thereto and the lower plate 500 may include at least one selected from other various materials.

The barrier layer BRL and the lower plate 500 may be coupled to each other by the adhesive layer 1050. The adhesive layer 1050 according to an embodiment may include a first portion overlapping the first non-folding area NFA1 and a second portion overlapping the second non-folding area NFA2. The first portion and the second portion may not overlap the folding area FA and may be disposed with a separation space 1050-OP in the first direction DR1. Thus, the adhesive layer 1050 may not overlap the plurality of plate openings OP of the lower plate 500. Accordingly, when the lower plate 500 is folded, the slit SL may be easily deformed without interference of the adhesive layer 1050.

The digitizer 600 may be disposed below the lower plate 500. The digitizer 600 may detect a signal transmitted by the pen SP (see FIG. 1A) among external input.

In the digitizer 600, a first area AR1, a second area AR2, and a third area AR3 may be defined in the first direction DR1. The first area AR1 may overlap the first non-folding area NFA1 and a portion of the folding area FA. The second area AR2 may overlap a portion of the folding area FA. The third area AR3 may overlap a portion of the folding area FA and the second non-folding area NFA2.

A plurality of holes H0 may be defined through the digitizer 600 in the second area AR2 of the digitizer 600. The plurality of holes H0 may be formed through the digitizer 600 or extending from an upper surface to a rear surface thereof. The plurality of holes H0 inside the second area AR2 may have a slit structure SL-D. The slit (SL-D) structure may have a shape in which the slits SL are connected to each other like a mesh.

The adhesive layer 1060 may be disposed between the lower plate 500 and the digitizer 600 to couple the lower plate 500 and the digitizer 600. The adhesive layer 1060 may overlap the first non-folding area NFA1 and the second non-folding area NFA2 and may not overlap the folding area FA such that the plurality of plate openings OP are exposed. That is, the adhesive layer 1060 may be disposed with a separation space 1060-OP in the first direction. Thus, the adhesive layer 1060 may not overlap the plurality of plate openings OP of the lower plate 500. Accordingly, when the lower plate 500 is folded, the slit SL may be easily deformed without interference of the adhesive layer 1050.

Figure 4A:
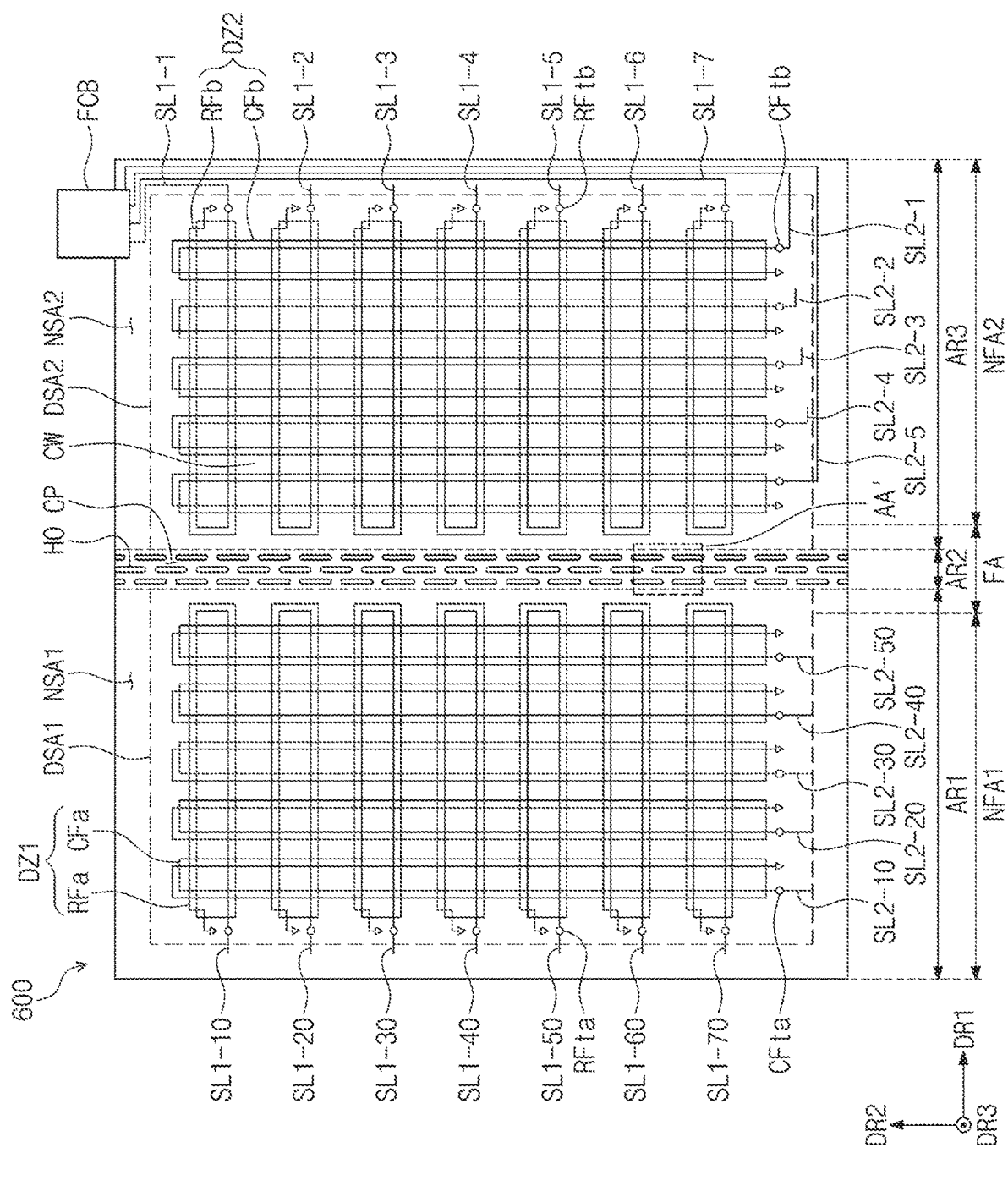
FIG. 4A is a plan view of a digitizer according to an embodiment of the disclosure.
Figure 4B:
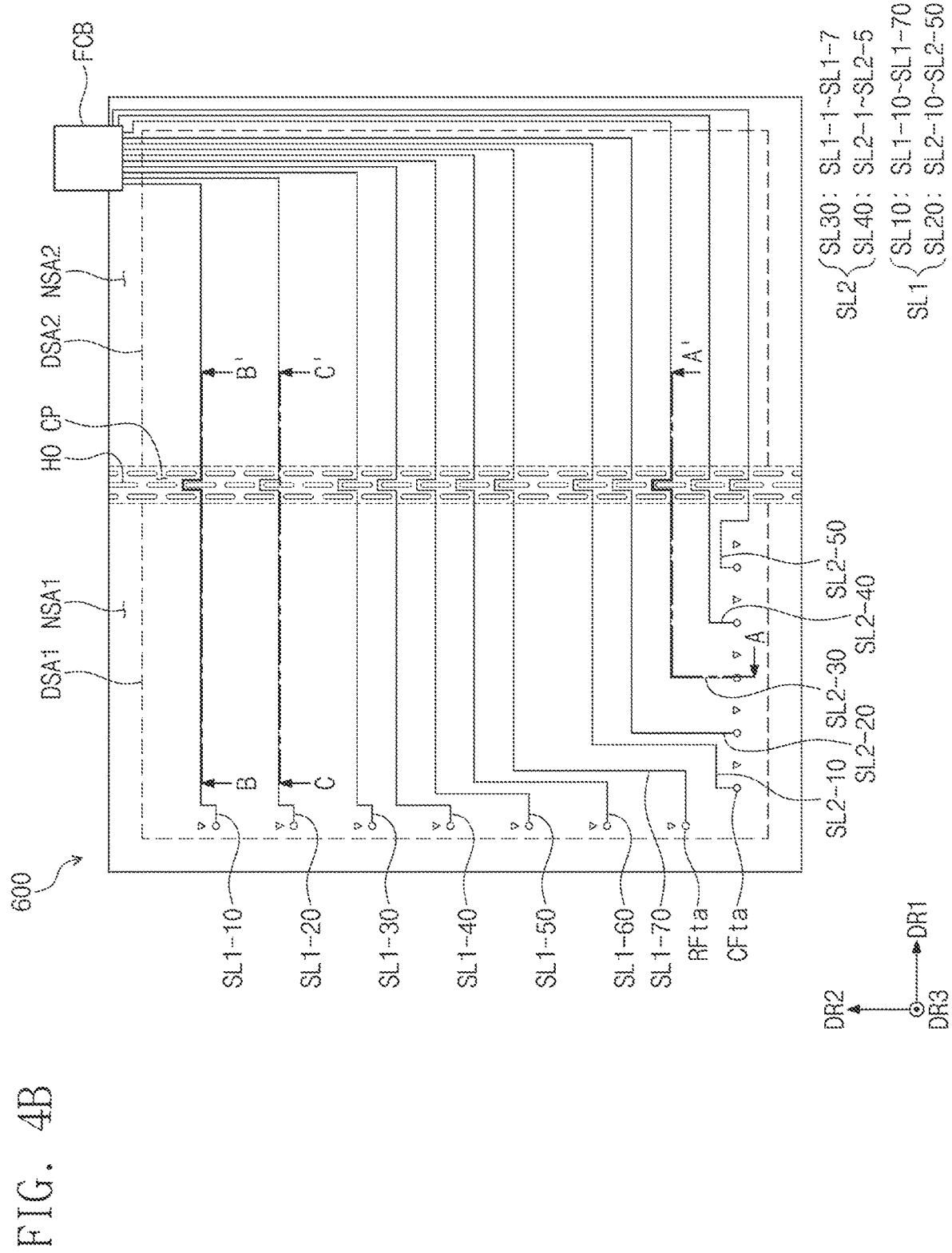
FIG. 4B is a plan view of first signal lines according to an embodiment of the disclosure.

FIG. 4A is a plan view of the digitizer 600 according to an embodiment of the disclosure, and FIG. 4B is a plan view of first signal lines SL1 according to an embodiment of the disclosure.

Referring to FIGS. 4A and 4B, in an embodiment, the digitizer 600 may include a first digitizer DZ1 and a second digitizer DZ2. The first digitizer DZ1 may be disposed in the first area AR1, and the second digitizer DZ2 may be disposed in the third area AR3. That is, the first digitizer DZ1 and the second digitizer DZ2 may be spaced apart from each other with the second area AR2 interposed therebetween.

The digitizer 600 may include the plurality of coils RFa, CFa, RFb, and CFb not overlapping the second area AR2. The plurality of coils RFa, CFa, RFb, and CFb may include a plurality of first coils RFa, a plurality of second coils CFa, a plurality of third coils RFb, and a plurality of fourth coils CFb.

The first area AR1 of the digitizer 600 may include a first detection area DSA1 and a first non-detection area NSA1 surrounding at least a portion of the first detection area DSA1. The first detection area DSA1 may be an area detected by the first digitizer DZ1. In an embodiment of the disclosure, the first detection area DSA1 may at least partially overlap the folding area FA.

The first digitizer DZ1 may include the plurality of first coils RFa and the plurality of second coils CFa. The plurality of first coils RFa and the plurality of second coils CFa may be arranged in the first area AR1. In an embodiment, the plurality of first coils RFa may refer to (or function as) detection coils, the plurality of second coils CFa may refer to driving coils, but the disclosure is not limited thereto. In an alternative embodiment, for example, the plurality of first coils RFa may be driving coils, and the plurality of second coils CFa may be detection coils.

Each of the plurality of first coils RFa may include a long side portion and a short side portion. The long side portions of the plurality of first coils RFa may extend in the first direction DR1 and may be spaced apart from each other in the second direction DR2. The short side portions may be connected to ends of the long side portions to connect the long side portions spaced apart from each other. Thus, each of the plurality of first coils RFa may form a loop. Each of the plurality of first coils RFa may form a loop that is wound two or more turns.

The long side portions and the short side portions of the plurality of first coils RFa may be arranged in or directly on a same layer as each other, but the disclosure is not limited thereto. In an alternative embodiment, for example, the long side portions and the short side portions may be arranged in or directly on different layers from each other. FIG. 4A illustrates an embodiment where the plurality of first coils RFa forming a loop are spaced apart from each other, but the disclosure is not limited thereto. In alternative an embodiment, for example, the long side portions included in coils adjacent to each other among the plurality of first coils RFa may be alternately arranged.

First terminals RFta may be arranged at distal ends of the plurality of first coils RFa, and ground terminals may be arranged at the other distal ends thereof. The first signal lines SL1 may be connected to the first terminals RFta of the plurality of first coils RFa, respectively.

Each of the plurality of second coils CFa may include a long side portion and a short side portion. The long side portions of the plurality of second coils CFa may extend in the second direction DR2. The short side portions may be connected to ends of the long side portions to connect the long side portions spaced apart from each other. Thus, each of the plurality of second coils CFa may form a loop. Each of the plurality of second coils CFa may form a loop that is wound two or more turns.

The long side portions and the short side portions of the plurality of second coils CFa may be arranged in or directly on a same layer as each other, but the disclosure is not limited thereto. In an embodiment, for example, the long side portions and the short side portions may be arranged in or directly on different layers from each other. FIG. 4A illustrates an embodiment where the plurality of second coils CFa forming a loop are spaced apart from each other, but the disclosure is not limited thereto. In an alternative embodiment, for example, the long side portions included in coils adjacent to each other among the plurality of second coils CFa may be alternately arranged.

Alternating current (AC) signals may be sequentially provided to second terminals CFta of the plurality of second coils CFa. Second terminals CFta may be arranged at distal ends of the plurality of second coils CFa, and ground terminals may be arranged at the other distal ends thereof. Second signal lines SL2 may be connected to the second terminals CFta of the plurality of second coils CFa, respectively.

When a current flows through the plurality of second coils CFa, a magnetic force line may be induced between the plurality of first coils RFa and the plurality of second coils CFa. The plurality of first coils RFa may detect an induced electromagnetic force emitted from the pen SP (see FIG. 1A) and output the detected signal to the first terminals RFta of the plurality of first coils RFa as a detection signal.

The third area AR3 of the digitizer 600 may include a second detection area DSA2 and a second non-detection area NSA2 surrounding at least a portion of the second detection area DSA2. The second detection area DSA2 may be an area detected by the second digitizer DZ2. In an embodiment of the disclosure, the second detection area DSA2 may at least partially overlap the folding area FA.

The second digitizer DZ2 may include the plurality of third coils RFb and the plurality of fourth coils CFb. The plurality of third coils RFb and the plurality of fourth coils CFb may be arranged in the third area AR3. The plurality of third coils RFb may refer to (or function as) detection coils, the plurality of fourth coils CFb may refer to driving coils, but the disclosure is not limited thereto. In an alternative embodiment, for example, the plurality of third coils RFb may be driving coils, and the plurality of fourth coils CFb may be detection coils.

Each of the plurality of third coils RFb may include a long side portion and a short side portion. The long side portions of the plurality of third coils RFb may extend in the first direction DR1 and may be spaced apart from each other in the second direction DR2. The short side portions may be connected to ends of the long side portions to connect the long side portions spaced apart from each other. Thus, each of the plurality of third coils RFb may form a loop. Each of the plurality of third coils RFb may form a loop that is wound two or more turns.

The long side portions and the short side portions of the plurality of third coils RFb may be arranged in or directly on a same layer as each other, but the disclosure is not limited thereto. In an alternative embodiment, for example, the long side portions and the short side portions may be arranged in or directly on different layers from each other. FIG. 4A illustrates an embodiment where the plurality of third coils RFb forming a loop are spaced apart from each other, but the disclosure is not limited thereto. In an alternative embodiment, for example, the long side portions included in coils adjacent to each other among the plurality of third coils RFb may be alternately arranged.

Each of the plurality of fourth coils CFb may include a long side portion and a short side portion. The long side portions of the plurality of fourth coils CFb may extend in the second direction DR2 and may be spaced apart from each other in the first direction DR1. The short side portions may be connected to ends of the long side portions to connect the long side portions spaced apart from each other. Thus, each of the plurality of fourth coils CFb may form a loop.

The long side portions and the short side portions of the plurality of fourth coils CFb may be arranged in or directly on a same layer as each other, but the disclosure is not limited thereto. In an alternative embodiment, for example, the long side portions and the short side portions may be arranged in or directly on different layers from each other. FIG. 4A illustrates an embodiment where the plurality of fourth coils CFb forming a loop are spaced apart from each other, but the disclosure is not limited thereto. In an alternative embodiment, for example, the long side portions included in coils adjacent to each other among the plurality of fourth coils CFb may be alternately arranged.

The plurality of first coils RFa and the plurality of third coils RFb may be spaced apart from each other at a predetermined distance with the second area AR2 interposed therebetween. The plurality of second coils CFa and the plurality of fourth coils CFb may be spaced apart from each other at a predetermined distance with the second area AR2 interposed therebetween. In this way, since the first and second coils RFa and CFa and the third and fourth coils RFb and CFb are separated from each other, stress generated in the first to fourth coils RFa, CFa, RFb, and CFb when the folding area FA is folded may be reduced. That is, since the plurality of coils RFa, CFa, RFb, and CFb are not arranged in the second area AR2, damage such as cracks of the plurality of coils RFa, CFa, RFb, and CFb due to physical impact when the folding area FA is folded may be minimized.

In an embodiment, only the first signal lines SL1, which will be described below, may be arranged in the second area AR2 (see FIG. 4B). Accordingly, the second area AR2 may be an area in which input of the pen SP (see FIG. 1A) is not detected.

In an embodiment, a width of the second area AR2 in the first direction DR1 may be less than a width of the folding area FA. Accordingly, the input of the pen SP (see FIG. 1) may be detected in an area of the folding area FA of the digitizer 600, which does not correspond to the second area AR2.

Operations of the plurality of third coils RFb and the plurality of fourth coils CFb may be substantially the same as those of the plurality of first coils RFa and the plurality of second coils CFa.

The plurality of holes H0 formed through the digitizer 600 and a passage area CP excluding the plurality of holes H0 may be defined in the second area AR2 of the digitizer 600. The plurality of holes H0 may extend in the second direction DR2 and may be arranged spaced apart from each other in the first direction DR1 and the second direction DR2. The plurality of coils RFa, CFa, RFb, and CFb may not be arranged in the passage area CP, and only the first signal lines SL1, which will be described below, may be arranged in the passage area CP.

A flexible circuit film PCB may be disposed in the third area AR3 of the digitizer 600, in which the second digitizer DZ2 is disposed. However, a position of the flexible circuit film FCB is merely illustrative, and the disclosure is not limited thereto. In an alternative embodiment, for example, the flexible circuit film FCB may be connected to the first area AR1 of the digitizer 600, in which the first digitizer DZ1 is disposed or the plurality of flexible circuit films PCB may be connected to the first and second digitizers DZ1 and DZ2.

In an embodiment, as shown in FIG. 4B, the first signal lines SL1 may include first type signal lines SL10 and second type signal lines SL20. The first signal lines SL1 may be connected to the plurality of first coils RFa or the plurality of second coils CFa, may overlap the first area AR1, the second area AR2, and the third area AR3, and may not overlap the plurality of holes H0. That is, the first signal lines SL1 may pass through the second area AR2 while passing between corresponding holes among the plurality of holes H0. Ends of the first signal lines SL1 may be connected to the first terminals RFta or the second terminals CFta, and the other (or opposite) ends thereof may be connected to the flexible circuit film FCB disposed in the third area AR3.

The number of first signal lines SL1 passing through the second area AR2 may be 50 or less. If the number of first signal lines SL1 passing through the second area AR2 is greater than 50, too many first signal lines pass through the narrow passage area CP, which makes a manufacturing process difficult, and thus a yield rate of a separable digitizer may decrease. Further, when the second area AR2 is folded, the first signal lines SL1 may be damaged. When the number of first signal lines SL1 is large, the number of damaged first signal lines SL1 may increase, and accordingly, a signal may not be effectively transmitted.

The first type signal lines SL10 may include first first type signal line (hereinafter, will be referred to as $(1-10)^{th}$ signal line) SL1-10 to seventh first type signal line (hereinafter, will be referred to as $(1-70)^{th}$ signal line) SL1-70. The first type signal lines SL10 may be connected to the first terminals RFta of the plurality of first coils RFa.

The second type signal lines SL20 may include a first second type signal line (hereinafter, will be referred to as $(2-10)^{th}$ signal line) SL2-10 to a fifth second type signal line (hereinafter, will be referred to as $(2-50)^{th}$ signal line) SL2-50. The second type signal lines SL20 may be connected to the second terminals CFta of the plurality of second coils CFa. Arrangement of the first type signal lines SL10 and the second type signal lines SL20 will be described below with reference to FIG. 4B.

The second signal lines SL2 may include third type signal lines SL30 and fourth type signal lines SL40. The second signal lines SL2 may be connected to the plurality of third coils RFb or the plurality of fourth coils CFb and may overlap the third area AR3. Ends of the second signal lines SL2 may be connected to the third terminals RFtb or the fourth terminals CFtb, and the other ends thereof may be connected to the flexible circuit film FCB disposed in the third area AR3. The second signal lines SL2 may extend to the second non-detection area NSA2 and may be connected to the flexible circuit film FCB.

The third type signal lines SL30 may include a first third type signal line (hereinafter, will be referred to as $(1-1)^{th}$ signal line) SL1-1 to a seventh third type signal line (hereinafter, will be referred to as $(1-7)^{th}$ signal line) SL1-7. The third type signal lines SL30 may be connected to the third terminals RFtb of the plurality of third coils RFb.

The fourth type signal lines SL40 may include a first fourth type signal line (hereinafter, will be referred to as $(2-1)^{th}$ signal line) SL2-1 to a fifth fourth type signal line (hereinafter, will be referred to as $(2-5)^{th}$ signal line) SL2-5. The fourth type signal lines SL40 may be connected to the fourth terminals CFtb of the plurality of fourth coils CFb.

Referring to FIG. 4B, an arrangement structure of the first signal lines SL1 may be identified. In an embodiment, the first signal lines SL1 and the first to fourth coils RFa, CFa, RFb, and CFb are arranged in or directly on different layers from each other, and may overlap each other in a plan view.

Some of the first signal lines SL1 may extend in the first direction DR1 across the first area AR1, the second area AR2, and the third area AR3. However, a portion of the first signal lines SL1, which overlaps the second area AR2, may pass through the passage area CP while not overlapping the corresponding holes among the plurality of holes H0. That is, the first signal lines SL1 may be bent while not overlapping the plurality of holes H0 in the second area AR2 in a plan view.

Figure 7:
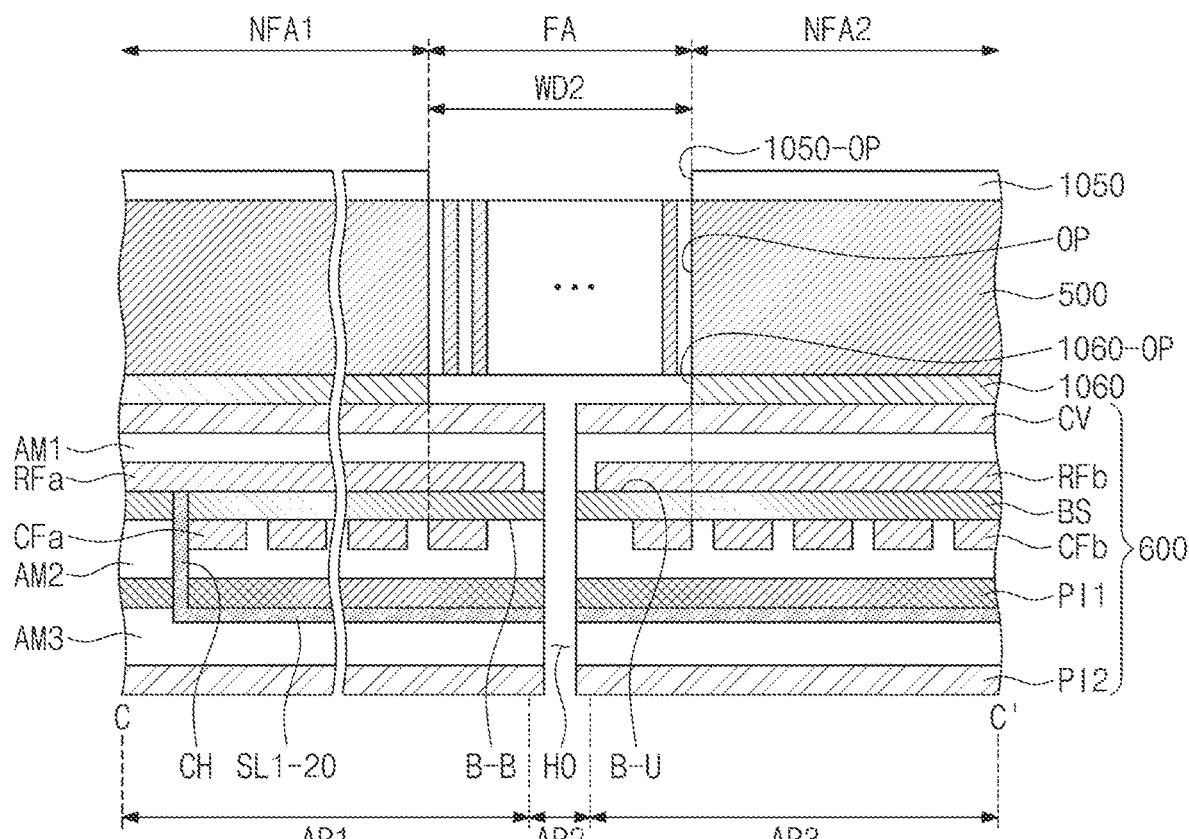
FIG. 7 is a cross-sectional view taken along line C-C' of FIG. 4B according to an embodiment of the disclosure.

The passage area CP except for the plurality of holes H0 may be defined in the digitizer 600. The passage area CP may be a passage through which the first signal lines SL1 electrically connecting the first and second digitizers DZ1 and DZ2 and the flexible circuit film FCB pass. The first signal lines SL1 may pass through only the passage area CP when passing the second area AR2. As illustrated in FIG. 7, the plurality of holes H0 is defined through the upper insulating layer CV, a first adhesive layer AM1, a second adhesive layer AM2, a third adhesive layer AM3, the base layer BS, the first insulating layer PI1, and the second insulating layer PI2, such that the first signal lines SL1 may not be allowed to pass through the plurality of holes H0.

In an embodiment, a space of the passage area CP through which the first signal lines SL1 may pass is insufficient. Accordingly, the first signal lines SL1 may be arranged in a plurality of layers. The first signal lines SL1 may overlap each other in a plan view and may be arranged in the plurality of layers passing through the same passage area CP. In an embodiment, for example, the first type signal lines SL10 and the second type signal lines SL20 may be arranged in different layers, respectively.

The arrangement of the first signal lines SL1 illustrated in FIG. 4B is merely illustrative, and any arrangement in which the first signal lines SL1 connect the first terminals RFta and the second terminals CFta with the flexible circuit film FCB, overlap the first to third areas AR1, AR2, and AR3, and do not overlap the plurality of holes H0 may be possible.

As illustrated in FIGS. 4A and 4B, the flexible circuit film FCB and the first to fourth coils RFa, CFa, RFb, and CFb may be connected to each other by the signal lines SL1 and SL2 connected to distal ends of the first to fourth coils RFa, CFa, RFb, and CFb. Accordingly, in such an embodiment, a single flexible circuit film FCB may be connected to the first to fourth coils RFa, CFa, RFb, and CFb, and components (not illustrated) such as a separate bridge flexible printed circuit (FPC), a neck FPC, and a connector for connection to the flexible circuit film FCB are omitted, such that a configuration of the digitizer 600 may be simplified.

Figure 5:
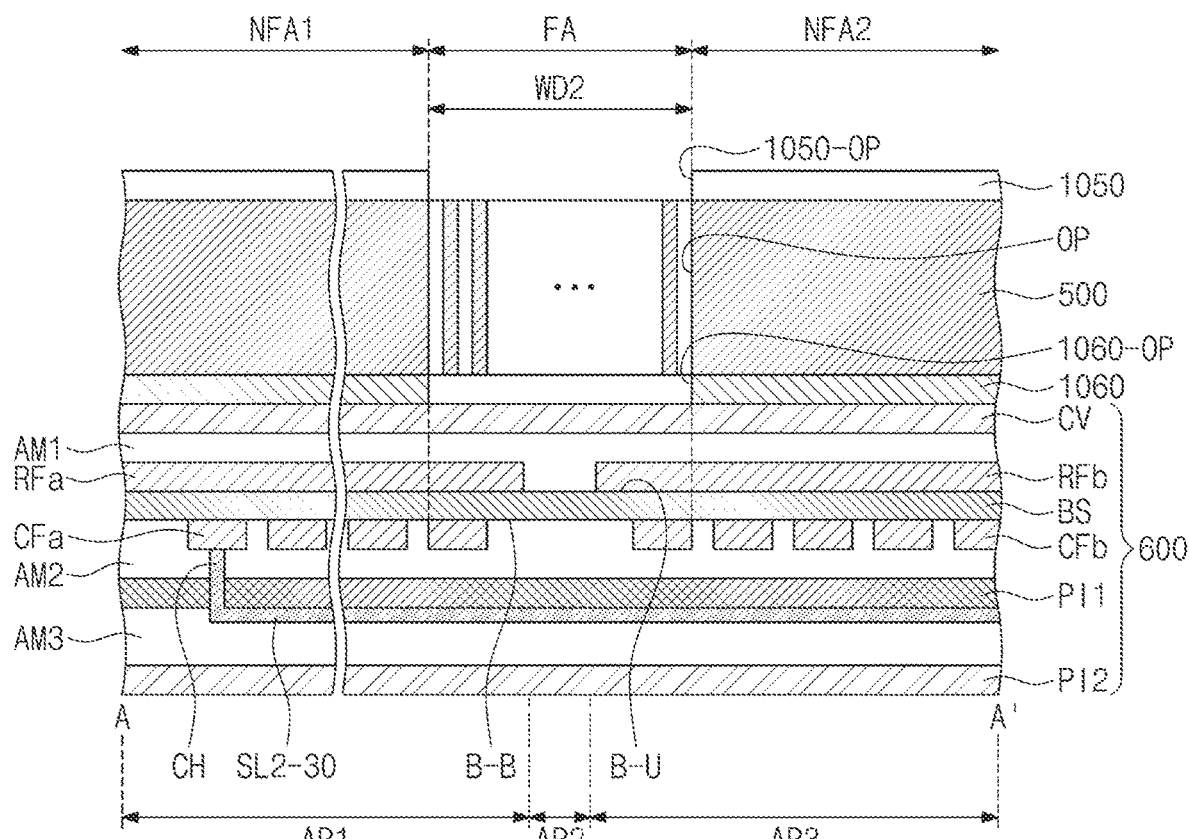
FIG. 5 is a cross-sectional view taken along line A-A' of FIG. 4B according to an embodiment of the disclosure.

FIG. 5 is a cross-sectional view taken along line A-A' of FIG. 4B according to an embodiment of the disclosure.

Referring to FIG. 5, an embodiment of the digitizer 600 may include the base layer BS and the $(2-30)^{th}$ signal line SL2-30. The first area AR1, the second area AR2, and the third area AR3 may be defined in the digitizer 600 in the first direction DR1.

The width of the second area AR2 may be less than a width WD2 of the folding area FA. The width of the second area AR2 may be greater than or equal to about 1 millimeter (mm) and less than or equal to about 5 mm. If the width of the second area AR2 is less than about 1 mm, the second area AR2 having a deformable shape is too narrow, a stress applied when the folding area FA is folded increases, and thus cracks may occur in the digitizer 600. If the width of the second area AR2 exceeds about 5 mm, an area in which the plurality of coils RFa, CFa, RFb, and CFb are not arranged increases, and thus recognition accuracy for external input may be degraded. Thus, in an embodiment, the width of the second area AR2 may be greater than or equal to about 1 mm and less than or equal to about 5 mm.

The base layer BS may include an upper surface B-U and a lower surface B-B facing the upper surface B-U. The base layer BS may include a synthetic rubber and a crosslinkable composition. However, the material of the base layer BS is illustrative, and the disclosure is not limited thereto.

The first coils RFa and the third coils RFb may be arranged on the upper surface B-U of the base layer BS, and the second coils CFa and the fourth coils CFb may be arranged on the lower surface B-B of the base layer BS.

The first adhesive layer AM1 may be disposed on the upper surface B-U of the base layer BS and cover the first coils RFa and the third coils RFb. The first adhesive layer AM1 may couple the base layer BS and the upper insulating layer CV to each other.

The second adhesive layer AM2 may be disposed on the lower surface B-B of the base layer BS and cover the second coils CFa and the fourth coils CFb. The second adhesive layer AM2 may couple the base layer BS and the first insulating layer PI1 to each other.

The digitizer 600 may further include the upper insulating layer CV attached to the first adhesive layer AM1 and the first insulating layer PI1 attached to the second adhesive layer AM2. The upper insulating layer CV and the first insulating layer PI1 may include polyimide. However, the material of the upper insulating layer CV and the first insulating layer PI1 is not limited thereto, and the upper insulating layer CV and the first insulating layer PI1 may include at least one selected from other various materials.

The digitizer 600 may further include the third adhesive layer AM3 disposed on a lower surface of the first insulating layer PI1 and the second insulating layer PI2 attached to the third adhesive layer AM3. The third adhesive layer AM3 may cover the $(2-30)^{th}$ signal line SL2-30. Here, the $(2-30)^{th}$ signal line SL2-30 is illustratively illustrated as one of the second type signal lines SL20, and the $(2-10)^{th}$ to $(2-50)^{th}$ signal lines SL2-10 to SL2-50 may be arranged as shown in FIG. 5 in a cross section. The third adhesive layer AM3 may couple the first insulating layer PI1 and the second insulating layer PI2 to each other.

The second insulating layer PI2 is a layer apart from the $(2-30)^{th}$ signal line SL2-30 at spaced a predetermined distance and may protect the $(2-30)^{th}$ signal line SL2-30 from internal impact. The second insulating layer PI2 may include polyimide. However, a material of the second insulating layer PI2 is not limited thereto, and may include at least one selected from other various materials.

The $(2-30)^{th}$ signal line SL2-30 may be disposed through the first area AR1, the second area AR2, and the third area AR3 in the first direction DR1. The $(2-30)^{th}$ signal line SL2-30 may be disposed on the first insulating layer PI1 and covered by the third adhesive layer AM3. The $(2-30)^{th}$ signal line SL2-30 may be connected to the second terminal CFta (see FIG. 4B) of the second coil CFa via a contact hole CH defined through the first insulating layer PI1. The contact hole CH may be positioned in the first area AR1 and may extend in the third direction DR3 intersecting the first direction DR1.

Figure 6:
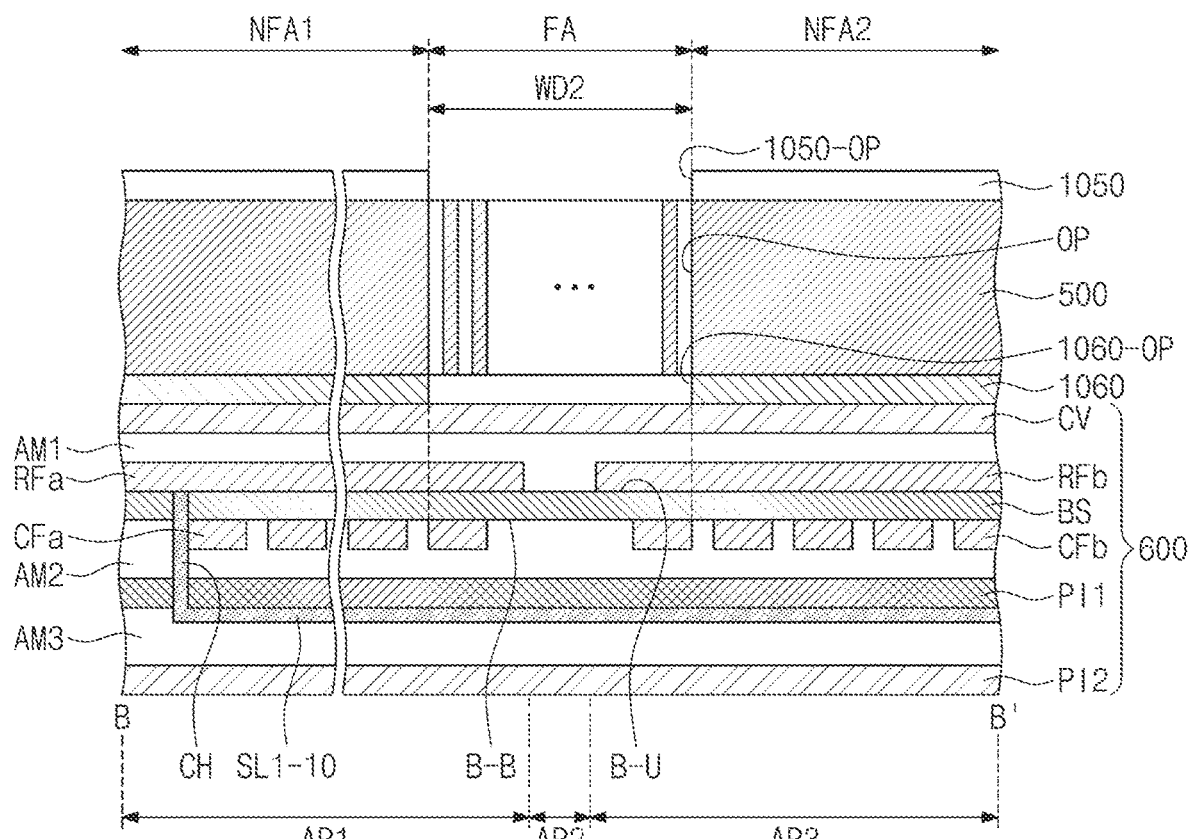
FIG. 6 is a cross-sectional view taken along line B-B' of FIG. 4B according to an embodiment of the disclosure.

FIG. 6 is a cross-sectional view taken along line B-B' of FIG. 4B according to an embodiment of the disclosure.

Referring to FIG. 6, an embodiment of the digitizer 600 may include the base layer BS and the $(1-10)^{th}$ signal line SL1-10. The same reference numerals are used for the same components as those described above, and any repetitive detailed description thereof will be omitted.

The $(1-10)^{th}$ signal line SL1-10 may be disposed through the first area AR1, the second area AR2, and the third area AR3 in the first direction DR1. The $(1-10)^{th}$ signal line SL1-10 may be disposed on the first insulating layer PI1 and covered by the third adhesive layer AM3. The $(1-10)^{th}$ signal line SL1-10 may be connected to the first terminal RFta (see FIG. 4B) of the first coil RFa by the contact hole CH defined through the first insulating layer PI1 and the base layer BS. The contact hole CH may be positioned in the first area AR1 and may extend in the third direction DR3 intersecting the first direction DR1.

Here, the $(1-10)^{th}$ signal line SL1-10 is illustratively illustrated as one of the first type signal lines SL10, and the $(1-10)^{th}$ to $(1-70)^{th}$ signal lines SL1-10 to SL1-70 may be arranged as shown in FIG. 6 in a cross section.

FIG. 7 is a cross-sectional view taken along line C-C' of FIG. 4B according to an embodiment of the disclosure.

Referring to FIG. 7, an embodiment of the digitizer 600 may include the $(1-20)^{th}$ signal line SL1-20. FIG. 7 is a cross-sectional view taken along line C-C' parallel to the first direction DR1 and illustrates the hole H0 unlike FIGS. 5 and 6.

The $(1-20)^{th}$ signal line SL1-20 may be disposed through the first area AR1, the second area AR2, and the third area AR3 in the first direction DR1. The $(1-20)^{th}$ signal line SL1-20 may be disposed on the first insulating layer PI1 and covered by the third adhesive layer AM3. The $(1-20)^{th}$ signal line SL1-20 may be connected to the first terminal RFta (see FIG. 4B) of the first coil RFa by the contact hole CH passing through the first insulating layer PI1 and the base layer BS. The contact hole CH may be positioned in the first area AR1 and may extend in the third direction DR3 intersecting the first direction DR1.

The $(1-20)^{th}$ signal line SL1-20 may not be disposed in the hole H0 of the second area AR2. Since the $(1-20)^{th}$ signal line SL1-20 is not disposed in the hole H0, such that the $(1-20)^{th}$ signal line SL1-20 may be effectively prevented from being damaged when the folding area FA is folded.

Here, the $(1-20)^{th}$ signal line SL1-20 is illustratively illustrated as one of the first type signal lines SL10, and the $(1-10)^{th}$ to $(1-70)^{th}$ signal lines SL1-10 to SL1-70 may be arranged as shown in FIG. 7 in a cross section.

The plurality of holes H0 may be defined or formed through the upper insulating layer CV, the first adhesive layer AM1, the base layer BS, the second adhesive layer AM2, the first insulating layer PI1, the third adhesive layer AM3, and the second insulating layer PI2. In such an embodiment, the plurality of holes H0 is formed completely through the digitizer 600, and thus when the folding area FA is folded, flexibility of the digitizer 600 may be improved, and cracks of the digitizer 600 may be prevented from occurring.

Figure 8:
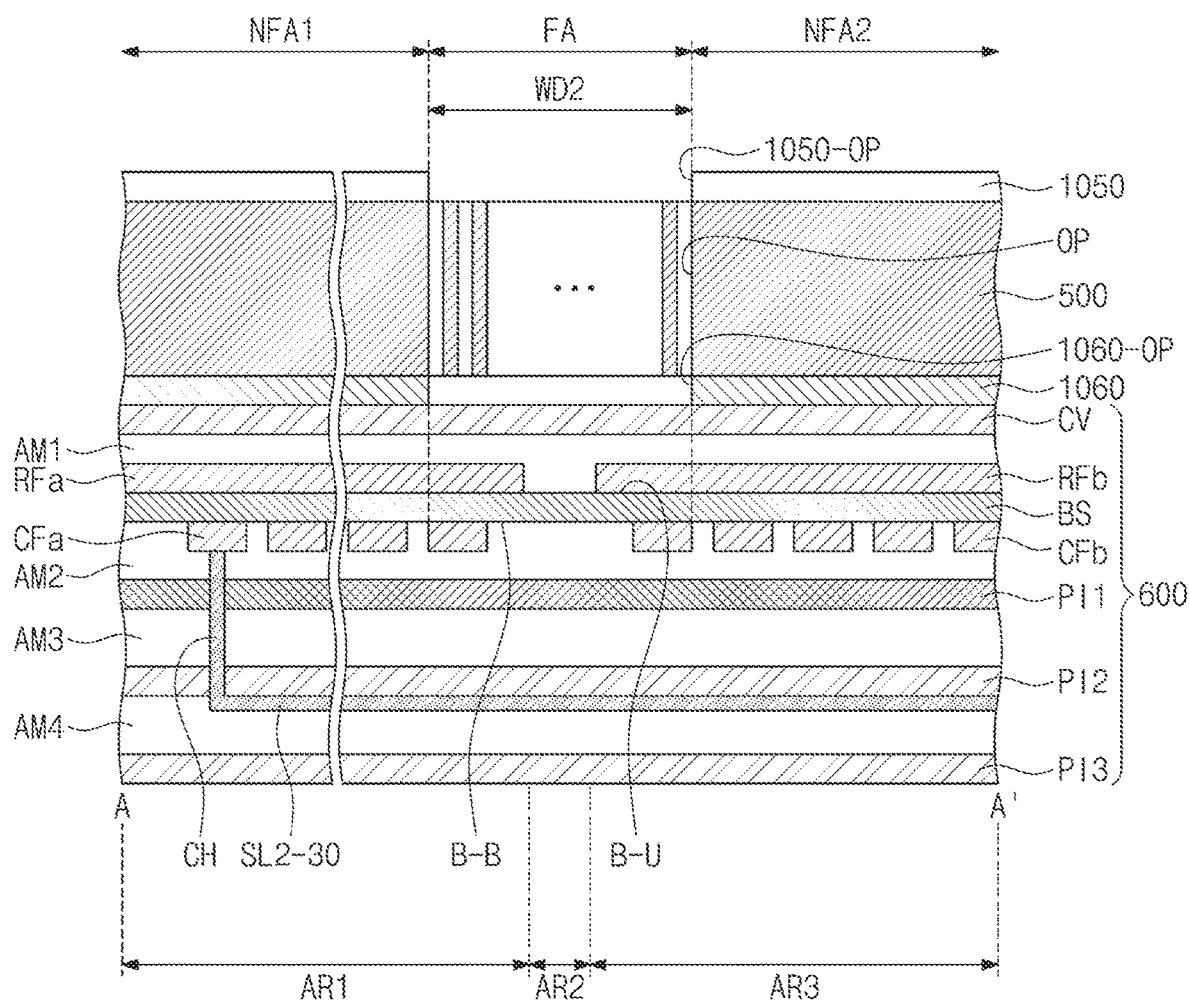
FIG. 8 is a cross-sectional view taken along line A-A' of FIG. 4B according to an embodiment of the disclosure.

FIG. 8 is a cross-sectional view taken along line A-A' of FIG. 4B according to an embodiment of the disclosure.

Referring to FIG. 8, an embodiment of the digitizer 600 may further include a fourth adhesive layer AM4 and a third insulating layer PI3. The same reference numerals are used for the same components of the digitizer 600, and any repetitive detailed description thereof will be omitted.

The fourth adhesive layer AM4 may be disposed on a lower surface of the second insulating layer PI2 and cover the $(2\text{-}30)^{th}$ signal line SL2-30. The fourth adhesive layer AM4 may couple the second insulating layer PI2 and the third insulating layer PI3 to each other.

The third insulating layer PI3 is a layer spaced a predetermined distance from the $(2\text{-}30)^{th}$ signal line SL2-30 and may protect the $(2\text{-}30)^{th}$ signal line SL2-30 from internal impact. The third insulating layer PI3 may include polyimide. However, a material of the third insulating layer PI3 is not limited thereto and may include at least one selected from other various materials.

The $(2\text{-}30)^{th}$ signal line SL2-30 may be disposed on the second insulating layer PI2 and covered by the fourth adhesive layer AM4. The $(2\text{-}30)^{th}$ signal line SL2-30 may extend from the first area AR1, the second area AR2, and the third area AR3 in a direction parallel to the first direction DR1.

The $(2\text{-}30)^{th}$ signal line SL2-30 may be connected to the second terminal CFta (see FIG. 4B) of the second coil CFa via a contact hole CH defined through the first insulating layer PI1 and the second insulating layer PI2. The contact hole CH may be positioned in the first area AR1 and may extend in the third direction DR3 intersecting the first direction DR1.

Here, the $(2\text{-}30)^{th}$ signal line SL2-30 is illustratively illustrated as one of the second type signal lines SL20, and the $(2\text{-}10)^{th}$ to $(2\text{-}50)^{th}$ signal lines SL2-10 to SL2-50 may be arranged as shown in FIG. 8 in a cross section.

The second type signal lines SL20 represented as the $(2\text{-}30)^{th}$ signal line SL2-30 and the first type signal lines (SL1-10 and SL1-20 in FIGS. 6 and 7) may be arranged in different layers from each other. Accordingly, as illustrated in FIG. 4B, when the width of the second area AR2 is narrow, and the plurality of holes H0 are formed and thus the passage area CP is narrow, the plurality of first signal lines SL1 may be arranged in or directly on different layers, and thus spatial limitation may be reduced.

Figure 9:
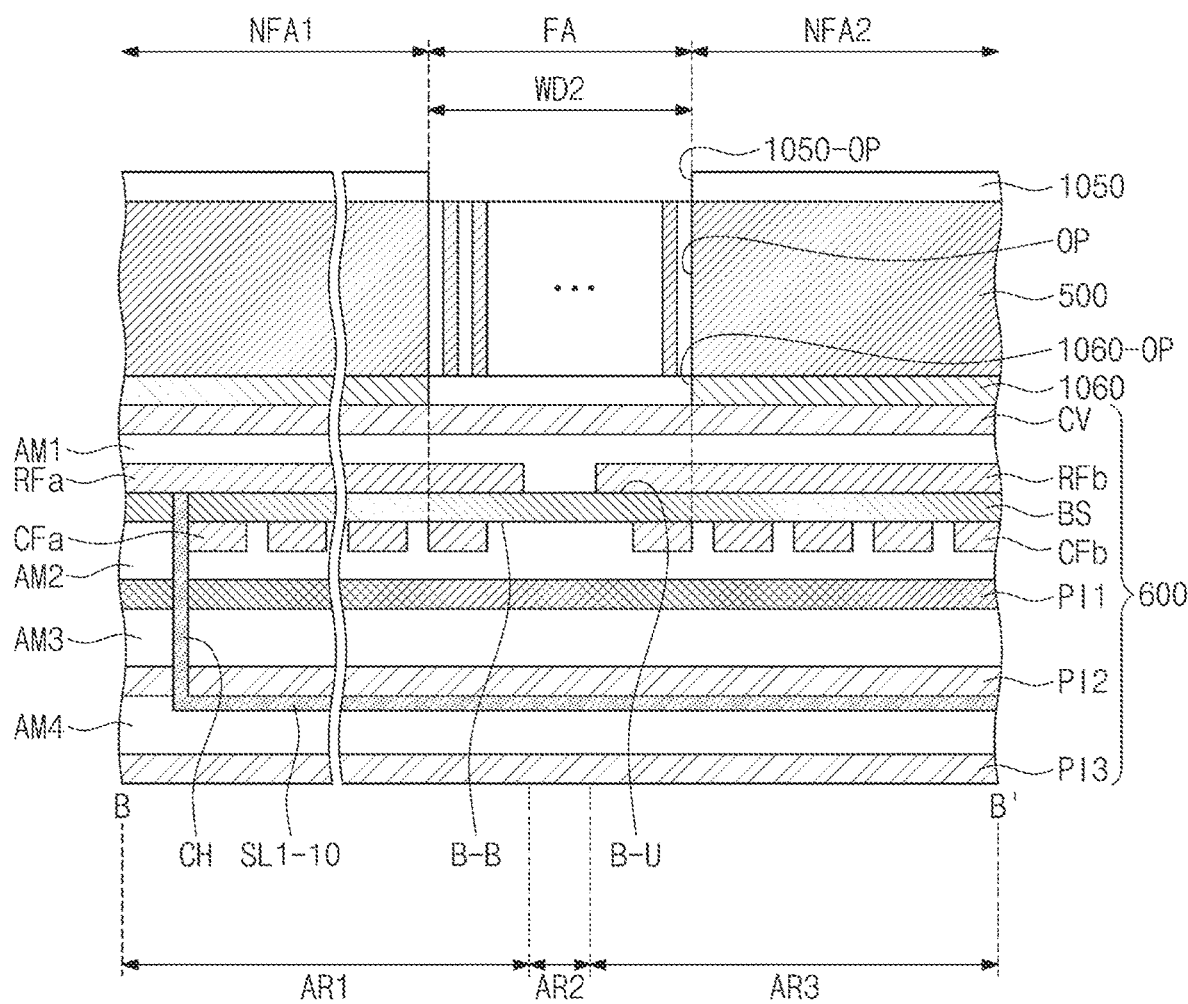
FIG. 9 is a cross-sectional view taken along line B-B' of FIG. 4B according to an embodiment of the disclosure.

FIG. 9 is a cross-sectional view taken along line B-B' of FIG. 4B according to an embodiment of the disclosure. The same reference numerals are used for the same components of the digitizer 600, and any repetitive detailed description thereof will be omitted.

Referring to FIG. 9, the $(1\text{-}10)^{th}$ signal line SL1-10 may be disposed on the second insulating layer PI2 and covered by the fourth adhesive layer AM4. The $(1\text{-}10)^{th}$ signal line SL1-10 may extend from the first area AR1, the second area AR2, and the third area AR3 in the direction parallel to the first direction DR1.

The $(1\text{-}10)^{th}$ signal line SL1-10 may be connected to the first terminal RFta (see FIG. 4B) of the first coil RFa by the contact hole CH defined through the first insulating layer PI1, the second insulating layer PI2, and the base layer BS.

The first type signal lines SL10 including the $(1\text{-}10)^{th}$ signal line SL1-10 and the second type signal lines SL20 including the $(2\text{-}30)^{th}$ signal line SL2-30 shown in FIG. 5 may be arranged in different layers from each other.

However, the disclosure is not limited to a case in which the first type signal lines SL10 and the second type signal lines SL20 are arranged in different layers, respectively. Alternatively, some of the first signal lines SL1 are arranged on the first insulating layer PI1 and the others of the first signal lines SL1 are arranged on the second insulating layer PI2.

In an embodiment, for example, some of the first type signal lines SL10 may be arranged on the first insulating layer PI1 as shown in FIG. 6, and the others of the first type signal lines SL10 may be arranged on the second insulating layer PI2 as shown in FIG. 9. In an embodiment, for example, some of the second type signal lines SL20 may be arranged on the first insulating layer PI1 as shown in FIG. 5, and the others of the second type signal lines SL20 may be arranged on the second insulating layer PI2 as shown in FIG. 8.

Figure 10:
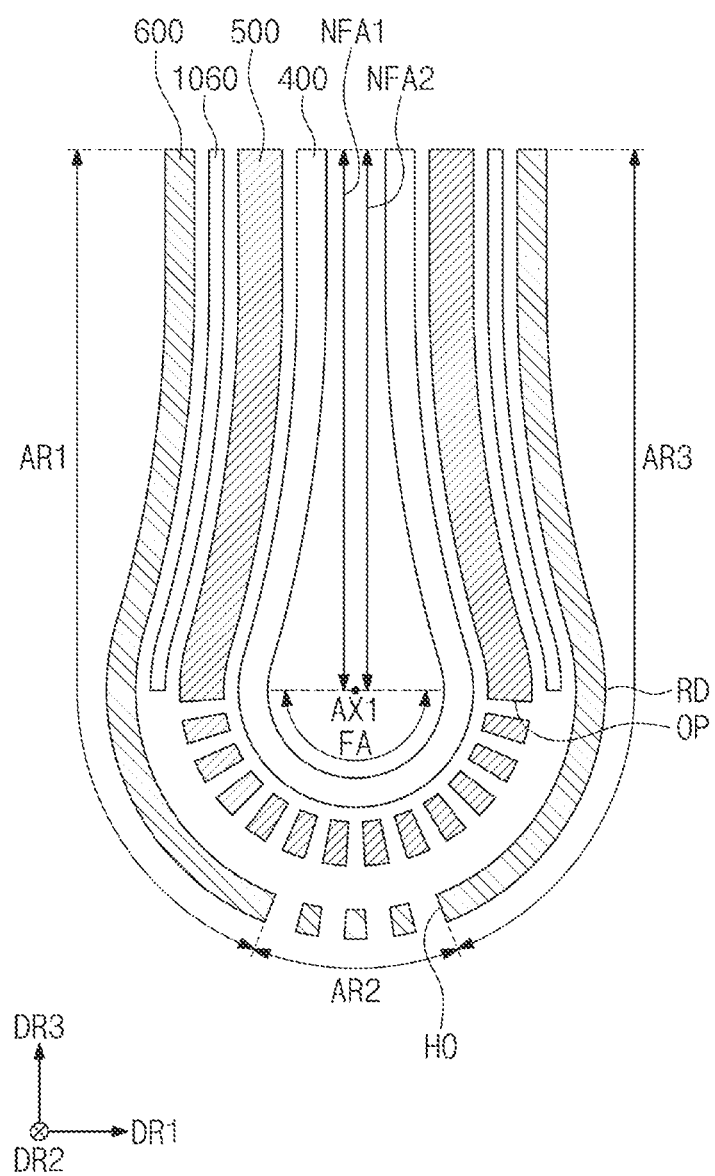
FIG. 10 is a partial cross-sectional view of the folded display device according to an embodiment of the disclosure.

FIG. 10 is a partial cross-sectional view of the folded display device EA (see FIG. 1) according to an embodiment of the disclosure.

Referring to FIG. 10, when the display device EA (see FIG. 1) is folded, an area of the plurality of plate openings OP may increase or decrease in the folding direction. In an embodiment, for example, when the display device EA is in-folded with respect to the first folding axis AX1 (see FIG. 1B), an area of the plurality of plate openings OP, which is adjacent to the digitizer 600, may increase, and an area of the plurality of plate openings OP, which is adjacent to the panel protection layer 400, may decrease. In an embodiment, the plurality of plate openings OP are formed in an area overlapping the folding area FA, such that the shape of the lower plate 500 may be more easily deformed when the display device EA is folded.

In an embodiment, when the display device EA is folded, an area of the plurality of holes H0 defined in the digitizer 600 may increase or decrease in the folding direction. In an embodiment, for example, when the display device EA is in-folded with respect to the first folding axis AX1 (see FIG. 1B), an area of the plurality of holes H0, which is adjacent to the lower plate 500, may decrease, and an area of the plurality of holes H0, which is adjacent to the second display surface RD, may increase.

The plurality of holes H0 is defined or formed in the second area AR2 of the digitizer 600, and thus when the display device EA is folded, stress applied to the digitizer 600 may be reduced. Accordingly, the digitizer 600 may be effectively prevented from being torn when a plurality of folding operations and a plurality of unfolding operations are repeatedly performed.

The display device EA may be a dumbbell-type display device EA in which, when the display device EA is folded, a width in the first direction DR1 at a portion passing through the first folding axis AX1 is greater than a width in the first direction DR1 at an upper end thereof. In a conventional digitizer including portions separated from each other to correspond to the first and second areas AR1 and AR2, a distal end of the digitizer corresponding to the first area AR1 and a distal end of the digitizer corresponding to the second area AR2 are not connected. Accordingly, when the dumbbell-type display device EA is folded, a gap between the distal end of the digitizer corresponding to the first area AR1 and the distal end of the digitizer corresponding to the second area AR2 is widened. Accordingly, interference that causes interference with a component disposed below the digitizer 600 occurs.

In embodiments of the disclosure, the digitizer 600 corresponding to the first area AR1 and the digitizer 600 corresponding to the second area AR2 are arranged along a curve of the lower plate 500 and are folded in the second area AR2 together. Thus, a possibility that signal interference occurs may be reduced.

According to embodiments of the disclosure, a structure of a digitizer may be simplified through arrangement of signal lines of a first digitizer and a second digitizer that are spaced apart from each other.

In such embodiments, by limiting the number of the signal lines, a processing yield rate may increase, and at the same time, folding reliability may be secured.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display module which includes a first non-folding area, a folding area adjacent to the first non-folding area and foldable with respect to a folding axis, and a second non-folding area adjacent to the folding area; and
   a digitizer disposed below the display module, wherein the digitizer includes a first area overlapping the first non-folding area and a portion of the folding area, a second area overlapping the folding area, and a third area overlapping a portion of the folding area and the second non-folding area,
   wherein a plurality of holes is defined in the second area through the digitizer, and
   the digitizer includes:
     a base layer;
     a plurality of first coils disposed on the base layer and overlapping the first area;
     a plurality of second coils disposed on the base layer and overlapping the third area;
     first signal lines connected to the plurality of first coils, wherein each of the first signal lines overlaps the first area, the second area and the third area, and does not overlap the plurality of holes; and
     second signal lines connected to the plurality of second coils and overlapping the third area; and
     a circuit board disposed in the third area and connected to the first signal lines and the second signal lines, wherein each of the first signal lines continuously extends from the circuit board in the third area to an end of a corresponding one of the plurality of first coils in the first area.

2. The display device of claim 1, wherein the first signal lines are disposed in a layer different from a layer in which the plurality of first coils and the plurality of second coils are disposed.

3. The display device of claim 1, wherein
   the plurality of first coils include first type coils extending in a first direction and second type coils extending in a second direction intersecting the first direction, and
   the plurality of second coils include third type coils extending in the first direction and fourth type coils extending in the second direction.

4. The display device of claim 3, wherein the first signal lines include:
   first type signal lines connected to the first type coils; and
   second type signal lines connected to the second type coils.

5. The display device of claim 4, wherein the first type signal lines and the second type signal lines are disposed in different layers, respectively.

6. The display device of claim 4, wherein
   the base layer includes a first surface and a second surface opposite to the first surface,
   the first type coils and the third type coils are disposed on the first surface, and
   the second type coils and the fourth type coils are disposed on the second surface.

7. The display device of claim 6, wherein the digitizer further includes:
   a first adhesive layer which is disposed on the first surface of the base layer and covers the first type coils and the third type coils; and
   a second adhesive layer which is disposed on the second surface of the base layer and covers the second type coils and the fourth type coils.

8. The display device of claim 7, wherein the digitizer further includes:
   a first insulating layer attached to the second adhesive layer;
   a third adhesive layer disposed on a lower surface of the first insulating layer; and
   a second insulating layer attached to the third adhesive layer.

9. The display device of claim 8, wherein the digitizer further includes:
   a fourth adhesive layer disposed on a lower surface of the second insulating layer; and
   a third insulating layer attached to the fourth adhesive layer.

10. The display device of claim 9, wherein
    one first signal line of the first signal lines is disposed on the first insulating layer and covered by the third adhesive layer, and
    another first signal line of the first signal lines is disposed on the second insulating layer and covered by the fourth adhesive layer.

11. The display device of claim 8, wherein the first type signal lines are connected to the first type coils via a contact hole defined through at least one selected from the first insulating layer, the second insulating layer, and the base layer.

12. The display device of claim 8, wherein the second type signal lines are connected to the second type coils via a contact hole defined through at least one selected from the first insulating layer and the second insulating layer.

13. The display device of claim 1, further comprising:
    a lower plate disposed between the display module and the digitizer,
    wherein a plurality of plate openings overlapping the folding area is defined through the lower plate.

14. The display device of claim 1, wherein a number of the first signal lines is 50 or less.

15. The display device of claim 1, wherein a width of the second area is less than a width of the folding area.

16. The display device of claim 1, wherein a width of the second area is greater than or equal to about 1 mm and less than or equal to about 5 mm.

17. A display device comprising:
- a display module which includes a first non-folding area, a folding area adjacent to the first non-folding area and foldable with respect to a folding axis, and a second non-folding area adjacent to the folding area;
- a lower plate disposed below the display module, wherein a plurality of plate openings overlapping the folding area are defined through the lower plate; and
- a digitizer disposed below the display module, wherein the digitizer includes a first area overlapping the first non-folding area and a portion of the folding area, a second area overlapping the folding area, and a third area overlapping a portion of the folding area and the second non-folding area,
- wherein a plurality of holes is defined in the second area through the digitizer, and
- the digitizer includes:
  - a base layer;
  - a plurality of coils disposed on the base layer;
  - signal lines connected to the plurality of coils in the first area, wherein each of the signal lines overlaps the first area, the second area and the third area; and
  - a circuit board disposed in the third area and connected to the signal lines,
- wherein each of the signal lines continuously extends from the circuit board in the third area to an end of a corresponding one of the plurality of coils in the first area by passing between corresponding holes among the plurality of holes.

18. The display device of claim 17, wherein a number of the signal lines is 50 or less.

19. The display device of claim 17, wherein one signal line and another signal line among the signal lines are disposed in different layers, respectively.

* * * * *